(12) United States Patent
Vonog et al.

(10) Patent No.: US 8,903,740 B2
(45) Date of Patent: *Dec. 2, 2014

(54) SYSTEM ARCHITECTURE AND METHODS FOR COMPOSING AND DIRECTING PARTICIPANT EXPERIENCES

(71) Applicant: Net Power and Light, Inc., San Francisco, CA (US)

(72) Inventors: Stanislav Vonog, San Francisco, CA (US); Nikolay Surin, San Francisco, CA (US); Tara Lemmey, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,319

(22) Filed: Apr. 30, 2013

(65) Prior Publication Data

US 2013/0339222 A1    Dec. 19, 2013

Related U.S. Application Data

(63) Continuation of application No. 13/136,869, filed on Aug. 12, 2011, now Pat. No. 8,463,677, and a continuation of application No. 13/367,146, filed on Feb. 6, 2012, now Pat. No. 8,571,956, which is a continuation of application No. 13/136,869, filed on Aug. 12, 2011, now Pat. No. 8,463,677.

(60) Provisional application No. 61/363,193, filed on Aug. 12, 2010.

(51) Int. Cl.
G06Q 40/00 (2012.01)
H04L 29/08 (2006.01)
A63F 13/30 (2014.01)
G06Q 40/02 (2012.01)

(52) U.S. Cl.
CPC ............. *H04L 67/02* (2013.01); *A63F 13/12* (2013.01); *G06Q 40/00* (2013.01); *G06Q 40/02* (2013.01); *A63F 2300/402* (2013.01); *A63F 2300/513* (2013.01); *A63F 2300/5506* (2013.01); *A63F 2300/5513* (2013.01); *A63F 2300/552* (2013.01); *A63F 2300/572* (2013.01)

USPC ............ 705/35; 725/93; 725/62; 725/39; 709/206; 709/224; 709/231; 726/29; 235/492; 370/254; 715/753

(58) Field of Classification Search
USPC .............. 725/93, 62, 39; 709/206, 224, 231; 726/29; 235/492; 370/254; 715/753
See application file for complete search history.

(56) References Cited

U.S. PATENT DOCUMENTS 5,491,743 A    2/1996    Shiio et al.
6,144,991 A    11/2000    England
(Continued)

FOREIGN PATENT DOCUMENTS

JP    2010-016662    1/2010
KR    10-2002-0038738    5/2002
(Continued)

OTHER PUBLICATIONS

Mobile content and service delivery platforms: a technology classification model; Ghezzi, Antonio; Marcelo Nogueira Cortimiglia; Balocco, Rafaello; Emerald Group Publishing, Limited; 2012.*

(Continued)

*Primary Examiner* — Tien Nguyen
(74) *Attorney, Agent, or Firm* — Perkins Coie LLP

(57) ABSTRACT

The present invention contemplates a variety of improved methods and systems for providing an experience platform, as well as sentio or experience codecs, and experience agents for supporting the experience platform. The experience platform may be provided by a service provider to enable an experience provider to compose and direct a participant experience. The service provider monetizes the experience by charging the experience provider and/or the participants for services. The participant experience can involve one or more experience participants. The experience provider can create an experience with a variety of dimensions and features. As will be appreciated, the following description provides one paradigm for understanding the multi-dimensional experience available to the participants. There are many suitable ways of describing, characterizing and implementing the experience platform contemplated herein.

15 Claims, 35 Drawing Sheets

(56) References Cited

U.S. PATENT DOCUMENTS

| | | |
|---|---|---|
| 7,171,485 B2 | 1/2007 | Roach et al. |
| 7,516,255 B1 | 4/2009 | Hobbs |
| 7,529,259 B2 | 5/2009 | Van Acker et al. |
| 7,760,640 B2 | 7/2010 | Brown et al. |
| 8,132,111 B2 | 3/2012 | Baron et al. |
| 8,171,154 B2 | 5/2012 | Vonog et al. |
| 8,234,398 B2 | 7/2012 | Vonog et al. |
| 8,255,552 B2 | 8/2012 | Witt et al. |
| 8,429,704 B2 | 4/2013 | Vonog et al. |
| 8,463,677 B2 | 6/2013 | Vonog et al. |
| 2002/0051493 A1 | 5/2002 | Shin et al. |
| 2002/0073155 A1* | 6/2002 | Anupam et al. .............. 709/205 |
| 2003/0074474 A1* | 4/2003 | Roach et al. ................. 709/246 |
| 2003/0074554 A1 | 4/2003 | Roach et al. |
| 2003/0188320 A1* | 10/2003 | Shing ............................ 725/131 |
| 2003/0217170 A1 | 11/2003 | Nelson et al. |
| 2004/0128350 A1 | 7/2004 | Topfl et al. |
| 2005/0100100 A1 | 5/2005 | Unger |
| 2007/0094691 A1* | 4/2007 | Gazdzinski .................... 725/62 |
| 2007/0162434 A1* | 7/2007 | Alessi et al. ...................... 707/4 |
| 2007/0217436 A1* | 9/2007 | Markley et al. ............. 370/401 |
| 2007/0271580 A1 | 11/2007 | Tischer et al. |
| 2008/0004888 A1 | 1/2008 | Davis et al. |
| 2008/0039205 A1 | 2/2008 | Ackley et al. |
| 2008/0056718 A1* | 3/2008 | Parker ............................. 398/58 |
| 2008/0068449 A1 | 3/2008 | Wu et al. |
| 2008/0112045 A1* | 5/2008 | Sasaki .......................... 359/365 |
| 2008/0134235 A1 | 6/2008 | Kalaboukis |
| 2008/0134239 A1* | 6/2008 | Knowles et al. ................ 725/39 |
| 2008/0139301 A1 | 6/2008 | Holthe |
| 2008/0158373 A1 | 7/2008 | Chu |
| 2008/0181260 A1 | 7/2008 | Vonog et al. |
| 2008/0195956 A1 | 8/2008 | Baron et al. |
| 2008/0205426 A1 | 8/2008 | Grover et al. |
| 2008/0267447 A1 | 10/2008 | Kelusky et al. |
| 2009/0013263 A1 | 1/2009 | Fortnow et al. |
| 2009/0046139 A1 | 2/2009 | Cutler et al. |
| 2009/0100452 A1 | 4/2009 | Hudgeons et al. |
| 2009/0115843 A1 | 5/2009 | Sohmers |
| 2009/0118017 A1 | 5/2009 | Perlman et al. |
| 2009/0158370 A1* | 6/2009 | Li et al. .......................... 725/110 |
| 2009/0183205 A1 | 7/2009 | McCartie et al. |
| 2009/0186700 A1 | 7/2009 | Konkle |
| 2009/0239587 A1 | 9/2009 | Negron et al. |
| 2009/0320077 A1* | 12/2009 | Gazdzinski .................... 725/62 |
| 2010/0004977 A1 | 1/2010 | Marci et al. |
| 2010/0064324 A1* | 3/2010 | Jenkin et al. ................... 725/59 |
| 2010/0103943 A1* | 4/2010 | Walter .......................... 370/401 |
| 2010/0107364 A1* | 5/2010 | Shen ............................... 16/221 |
| 2010/0113140 A1 | 5/2010 | Kelly et al. |
| 2010/0149096 A1 | 6/2010 | Migos et al. |
| 2010/0156812 A1 | 6/2010 | Stallings et al. |
| 2010/0185514 A1 | 7/2010 | Glazer et al. |
| 2010/0191859 A1* | 7/2010 | Raveendran ................. 709/231 |
| 2010/0257251 A1 | 10/2010 | Mooring et al. |
| 2010/0268843 A1 | 10/2010 | Van Wie et al. |
| 2010/0278508 A1 | 11/2010 | Aggarwal |
| 2011/0046980 A1 | 2/2011 | Metzler et al. |
| 2011/0103374 A1 | 5/2011 | Lajoie et al. |
| 2011/0116540 A1 | 5/2011 | O'Connor et al. |
| 2011/0145817 A1 | 6/2011 | Grzybowski |
| 2011/0151976 A1 | 6/2011 | Holloway et al. |
| 2011/0225515 A1 | 9/2011 | Goldman et al. |
| 2011/0244954 A1 | 10/2011 | Goldman et al. |
| 2011/0246908 A1 | 10/2011 | Akram et al. |
| 2011/0271208 A1 | 11/2011 | Jones et al. |
| 2011/0292181 A1 | 12/2011 | Acharya et al. |
| 2011/0298827 A1 | 12/2011 | Perez |
| 2011/0302532 A1 | 12/2011 | Missig |
| 2012/0038550 A1 | 2/2012 | Lemmey et al. |
| 2012/0039382 A1 | 2/2012 | Vonog et al. |
| 2012/0041859 A1 | 2/2012 | Vonog et al. |
| 2012/0060101 A1 | 3/2012 | Vonog et al. |
| 2012/0078788 A1 | 3/2012 | Gandhi |
| 2012/0082226 A1 | 4/2012 | Weber |
| 2012/0084738 A1 | 4/2012 | Sirpal |
| 2012/0131458 A1 | 5/2012 | Hayes |
| 2012/0191586 A1 | 7/2012 | Vonog et al. |
| 2012/0206262 A1 | 8/2012 | Grasso |
| 2012/0206558 A1 | 8/2012 | Setton |
| 2012/0206560 A1 | 8/2012 | Setton |
| 2013/0019184 A1 | 1/2013 | Vonog et al. |

FOREIGN PATENT DOCUMENTS

| | | |
|---|---|---|
| KR | 10-2006-0062381 | 6/2006 |
| KR | 10-2006-0083034 | 7/2006 |
| KR | 10-2008-0008340 | 1/2008 |
| KR | 10-2009-0113158 | 10/2009 |
| KR | 10-2010-0098668 | 9/2010 |
| WO | WO 02-41121 | 5/2002 |
| WO | WO 2007/084994 | 7/2007 |
| WO | WO 2008-072923 | 6/2008 |

OTHER PUBLICATIONS

Personalized Multimedia News Agents in a Broadband Environment; Wen Bin Kwan; Ottawa-Carleton Institute of Electrical Engineering; Sep. 1996.*

Non-Final Office Action mailed Aug. 15, 2014, in Co-Pending U.S. Appl. No. 13/221,801 of Vonog, S., et al., filed Aug. 30, 2011.

Ettin, Scott A.; "Band of the Hand: Handheld Media Platforms from Palm OS to Pocket PC Pose New Challenges to Video Producers, But They Also Present New Opportunities"; Emedia, The Digital Studio Magazine; 16, 1, 44(2) (Jan. 2003).

Moote, et al.; "Moving Toward a Dual-Infrastructure Facility"; Broadcast Engineering; vol. 46, No. 9, pp. 72-78 (Sep. 2004).

"Broadcom Announces Industry's Most Advanced High Definition AVC Encoder/Transcoder that Transforms the PC into a Multimedia Server"; PR Newswire (Jan. 7, 2008).

International Search Report and Written Opinion of PCT Application No. PCT/US2011/001424, mailed Apr. 6, 2012.

International Search Report and Written Opinion of PCT Application No. PCT/US2011/001425, mailed Apr. 6, 2012.

International Search Report and Written Opinion of PCT Application No. PCT/US2011/057385, mailed May 16, 2012.

International Search Report and Written Opinion of PCT Application No. PCT/US2011/047815, mailed Apr. 9, 2012.

International Search Report and Written Opinion of PCT Application No. PCT/US2011/047814, mailed Apr. 9, 2012.

Co-Pending U.S. Appl. No. 13/136,869 of Vonog, S., et al., filed Aug. 12, 2011.

Co-Pending U.S. Appl. No. 13/367,146 of Vonog, S., et al., filed Feb. 6, 2012.

Co-Pending U.S. Appl. No. 13/136,870 of Vonog, S., et al., filed Aug. 12, 2011.

Co-Pending U.S. Appl. No. 13/363,187 of Vonog, S., et al., filed Jan. 31, 2012.

Co-Pending U.S. Appl. No. 13/221,801 of Vonog, S., et al., filed Aug. 30, 2011.

Co-Pending U.S. Appl. No. 13/279,096 of Vonog, S., et al., filed Oct. 21, 2011.

Co-Pending U.S. Appl. No. 13/762,149 of Vonog. S., filed Feb. 7, 2013.

Co-Pending U.S. Appl. No. 13/210,370 of Lemmey, T., et al., filed Aug. 15, 2011.

Co-Pending U.S. Appl. No. 13/461,680 of Vonog, S., et al., filed May 1, 2012.

Co-Pending U.S. Appl. No. 13/546,906 of Vonog, S., et al., filed Jul. 11, 2012.

Co-Pending U.S. Appl. No. 13/694,582 of Lemmey, T., et al., filed Dec. 12, 2012.

Co-Pending U.S. Appl. No. 13/694,581 of Vonog, S., et al., filed Dec. 12, 2012.

Non-Final Office Action mailed Sep. 11, 2012, in Co-Pending U.S. Appl. No. 13/136,869 of Vonog, S., et al., filed Sep. 7, 2012.

Notice of Allowance mailed Apr. 3, 2013, in Co-Pending U.S. Appl. No. 13/163,869 of Vonog, S., et al., filed Sep. 7, 2012.

(56) References Cited

OTHER PUBLICATIONS

Non-Final Office Action mailed Mar. 19, 2013, in Co-Pending U.S. Appl. No. 13/367,146 of Vonog, S., et al., filed Feb. 6, 2012.
Notice of Allowance mailed Sep. 4, 2013, in Co-Pending U.S. Appl. No. 13/367,146 of Vonog, S., et al., filed Feb. 6, 2012.
Non-Final Office Action mailed Apr. 1, 2013, in Co-Pending U.S. Appl. No. 13/221,801 of Vonog, S., et al., filed Aug. 30, 2011.
Final Office Action mailed Aug. 15, 2013, in Co-Pending U.S. Appl. No. 13/221,801 of Vonog, S., et al., filed Aug. 30, 2011.
Notice of Allowance mailed Feb. 4, 2013, in Co-Pending U.S. Appl. No. 13/279,096 of Vonog, S., et al., filed Oct. 21, 2011.
Non-Final Office Action mailed Jul. 9, 2014, in Co-Pending U.S. Appl. No. 13/461,680, filed May 1, 2012.
Non-Final Office Action mailed Jun. 19, 2014, in Co-Pending U.S. Appl. No. 13/210,370, filed Aug. 15, 2011.

* cited by examiner

Experience Agent Components

Tasks

| Name | Activator | Command | State | Slave | ID | Age | Active |
|---|---|---|---|---|---|---|---|
| Merger | xdLAQodf | Python Code | Running | powerslave | 308 | 00:00:10 | 00:00:10 |
| Encoder #0 | - | Python Code | Finished | - | - | 00:00:09 | 00:00:08 |
| Encoder #1 | xdLAQodf | Python Code | Running | i-ble946da | 205 | 00:00:09 | 00:00:09 |
| Encoder #2 | xdLAQodf | Python Code | Running | i-b7e946dc | 204 | 00:00:09 | 00:00:09 |
| Encoder #3 | xdLAQodf | Python Code | Running | i-b7e946dc | 205 | 00:00:09 | 00:00:09 |
| Encoder #4 | xdLAQodf | Python Code | Running | i-b7e946dc | 206 | 00:00:09 | 00:00:09 |
| Encoder #5 | xdLAQodf | Python Code | Running | i-b7e946dc | 207 | 00:00:09 | 00:00:09 |
| Encoder #6 | - | Python Code | Finished | - | - | 00:00:09 | 00:00:09 |
| Encoder #7 | xdLAQodf | Python Code | Running | i-ble946da | 206 | 00:00:09 | 00:00:09 |
| Encoder #8 | xdLAQodf | Python Code | Running | i-ble946da | 207 | 00:00:09 | 00:00:09 |
| Encoder #9 | xdLAQodf | Python Code | Running | powerslave | 310 | 00:00:09 | 00:00:09 |
| Encoder #10 | xdLAQodf | Python Code | Running | powerslave | 311 | 00:00:09 | 00:00:09 |
| Encoder #11 | - | Python Code | Finished | - | - | 00:00:09 | 00:00:04 |

Activators

| Name | Connected |
|---|---|
| xdLAQodf | Yes |

Slaves

| Name | Ready | Load | Capacity |
|---|---|---|---|
| i-ble946da | Yes | 3 | 4 |
| powerslave | Yes | 3 | 5 |
| i-b7e946dc | No | 4 | 4 |

SYSTEM ARCHITECTURE AND METHODS FOR COMPOSING AND DIRECTING PARTICIPANT EXPERIENCES

CLAIM OF PRIORITY

The present application is a Continuation of U.S. patent application Ser. No. 13/136,869, entitled SYSTEM ARCHITECTURE AND METHODS FOR EXPERIENTIAL COMPUTING, filed on Aug. 12, 2011 and U.S. patent application Ser. No. 13/367,146, filed Feb. 6, 2012, entitled SYSTEM ARCHITECTURE AND METHODS FOR COMPOSING AND DIRECTING PARTICIPANT EXPERIENCES which claims priority to U.S. Provisional Application No. 61/373,193, entitled "SYSTEM ARCHITECTURE AND METHODS FOR COMPOSING AND DIRECTING PARTICIPANT EXPERIENCES," filed on Aug. 12, 2010, all of which are incorporated in their entirety herein by this reference.

BACKGROUND OF INVENTION

Summary of the Invention

The present invention contemplates a variety of improved methods and systems for providing a general purpose tool to enable a wide variety of applications referred to experiential computing.

Some of the attributes of "experiential computing" are: 1) pervasive—it assumes multi-screen, multi-device, multi-sensor computing environments both personal and public; this is in contrast to "personal computing" paradigm where computing is defined as one person interacting with one device (such as a laptop or phone) at any given time; 2) the applications focus on invoking feelings and emotions as opposed to consuming and finding information or data processing; 3) multiple dimensions of input and sensor data—such as physicality; 4) people connected together—live, synchronously: multi-person social real-time interaction allowing multiple people interact with each other live using voice, video, gestures and other types of input.

The experience platform may be provided by a service provider to enable an experience provider to compose and direct a participant experience. The service provider monetizes the experience by charging the experience provider and/or the participants for services. The participant experience can involve one or more experience participants. The experience provider can create an experience with a variety of dimensions and features. As will be appreciated, the following description provides one paradigm for understanding the multi-dimensional experience available to the participants. There are many suitable ways of describing, characterizing and implementing the experience platform contemplated herein.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

FIGS. 23-25 illustrate an exemplary multi-device video transcoding service utilized by the transcoding application, and incorporating a third-party service.

DETAILED DESCRIPTION OF THE INVENTION

Figure 1:
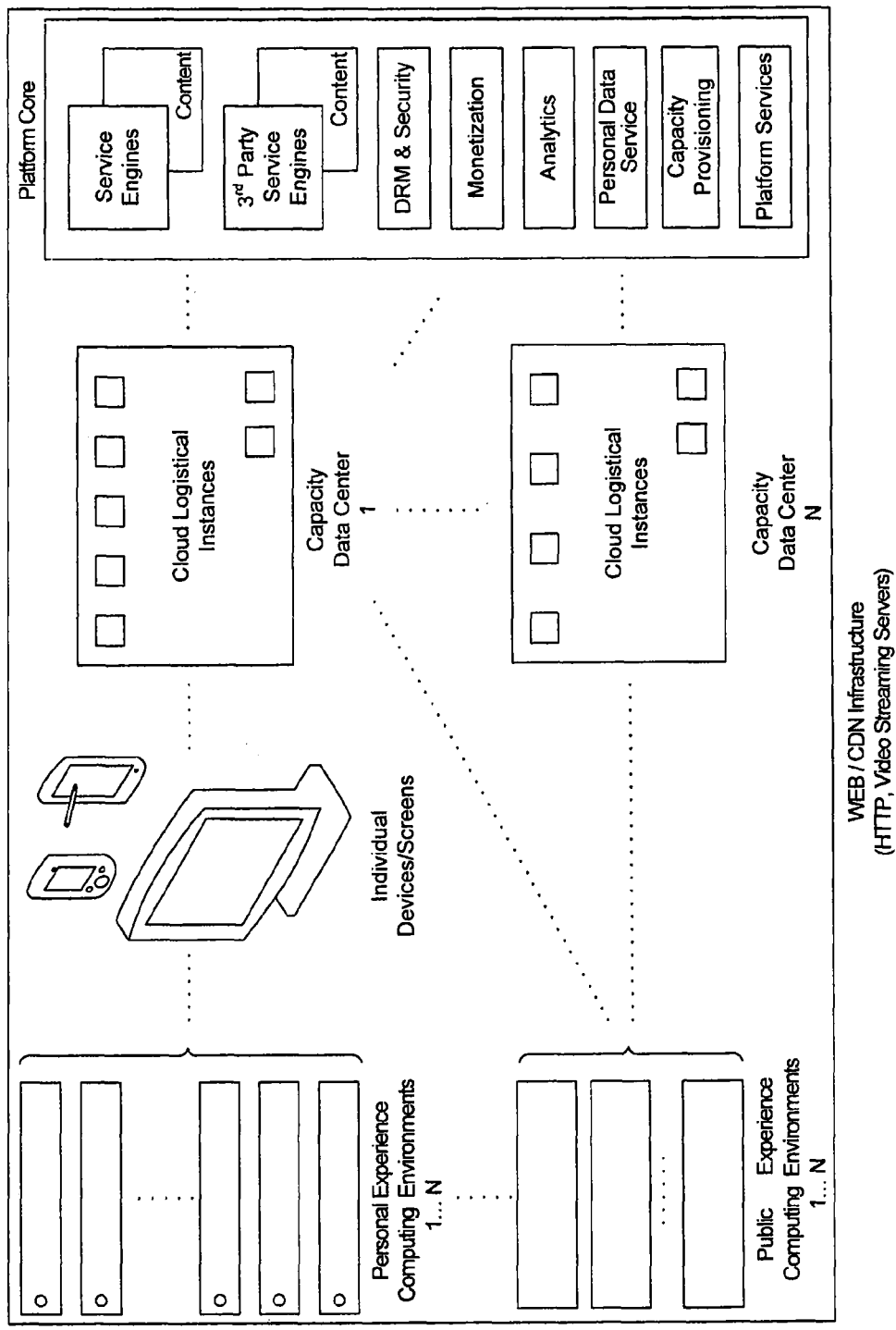
FIG. 1 illustrates a general system architecture for the experience platform.

FIG. 1 illustrates a general system architecture for the experience platform. The system 10 can be viewed as an "experience platform" or system architecture for composing and directing a participant experience. In one embodiment, the experience platform 10 is provided by a service provider to enable an experience provider to compose and direct a participant experience. The participant experience can involve one or more experience participants. The experience provider can create an experience with a variety of dimensions, as will be explained further now. As will be appreciated, the following description provides one paradigm for understanding the multi-dimensional experience available to the participants. There are many suitable ways of describing, characterizing and implementing the experience platform contemplated herein.

In general, services are defined at an API layer of the experience platform. The services are categorized into "dimensions." The dimension(s) can be recombined into "layers." The layers form to make features in the experience.

By way of example, the following are some of the dimensions that can be supported on the experience platform.

Video—is the near or substantially real-time streaming of the video portion of a video or film with near real-time display and interaction.

Audio—is the near or substantially real-time streaming of the audio portion of a video, film, karaoke track, song, with near real-time sound and interaction.

Live—is the live display and/or access to a live video, film, or audio stream in near real-time that can be controlled by another experience dimension. A live display is not limited to single data stream.

Encore—is the replaying of a live video, film or audio content. This replaying can be the raw version as it was originally experienced, or some type of augmented version that has been edited, remixed, etc.

Graphics—is a display that contains graphic elements such as text, illustration, photos, freehand geometry and the attributes (size, color, location) associated with these elements. Graphics can be created and controlled using the experience input/output command dimension(s) (see below).

Input/Output Command(s)—are the ability to control the video, audio, picture, display, sound or interactions with human or device-based controls. Some examples of input/output commands include physical gestures or movements, voice/sound recognition, and keyboard or smart-phone device input(s).

Interaction—is how devices and participants interchange and respond with each other and with the content (user experience, video, graphics, audio, images, etc.) displayed in an experience. Interaction can include the defined behavior of an artifact or system and the responses provided to the user and/or player.

Game Mechanics—are rule-based system(s) that facilitate and encourage players to explore the properties of an experience space and other participants through the use of feedback mechanisms. Some services on the experience Platform that could support the game mechanics dimensions include leader boards, polling, like/dislike, featured players, star-ratings, bidding, rewarding, role-playing, problem-solving, etc.

Ensemble—is the interaction of several separate but often related parts of video, song, picture, story line, players, etc. that when woven together create a more engaging and immersive experience than if experienced in isolation.

Auto Tune—is the near real-time correction of pitch in vocal and/or instrumental performances. Auto Tune is used to disguise off-key inaccuracies and mistakes, and allows singer/players to hear back perfectly tuned vocal tracks without the need of singing in tune.

Auto Filter—is the near real-time augmentation of vocal and/or instrumental performances. Types of augmentation could include speeding up or slowing down the playback, increasing/decreasing the volume or pitch, or applying a celebrity-style filter to an audio track (like a Lady Gaga or Heavy-Metal filter).

Remix—is the near real-time creation of an alternative version of a song, track, video, image, etc. made from an original version or multiple original versions of songs, tracks, videos, images, etc.

Viewing 360°/Panning—is the near real-time viewing of the 360° horizontal movement of a streaming video feed on a fixed axis. Also the ability to for the player(s) to control and/or display alternative video or camera feeds from any point designated on this fixed axis.

Figure 2:
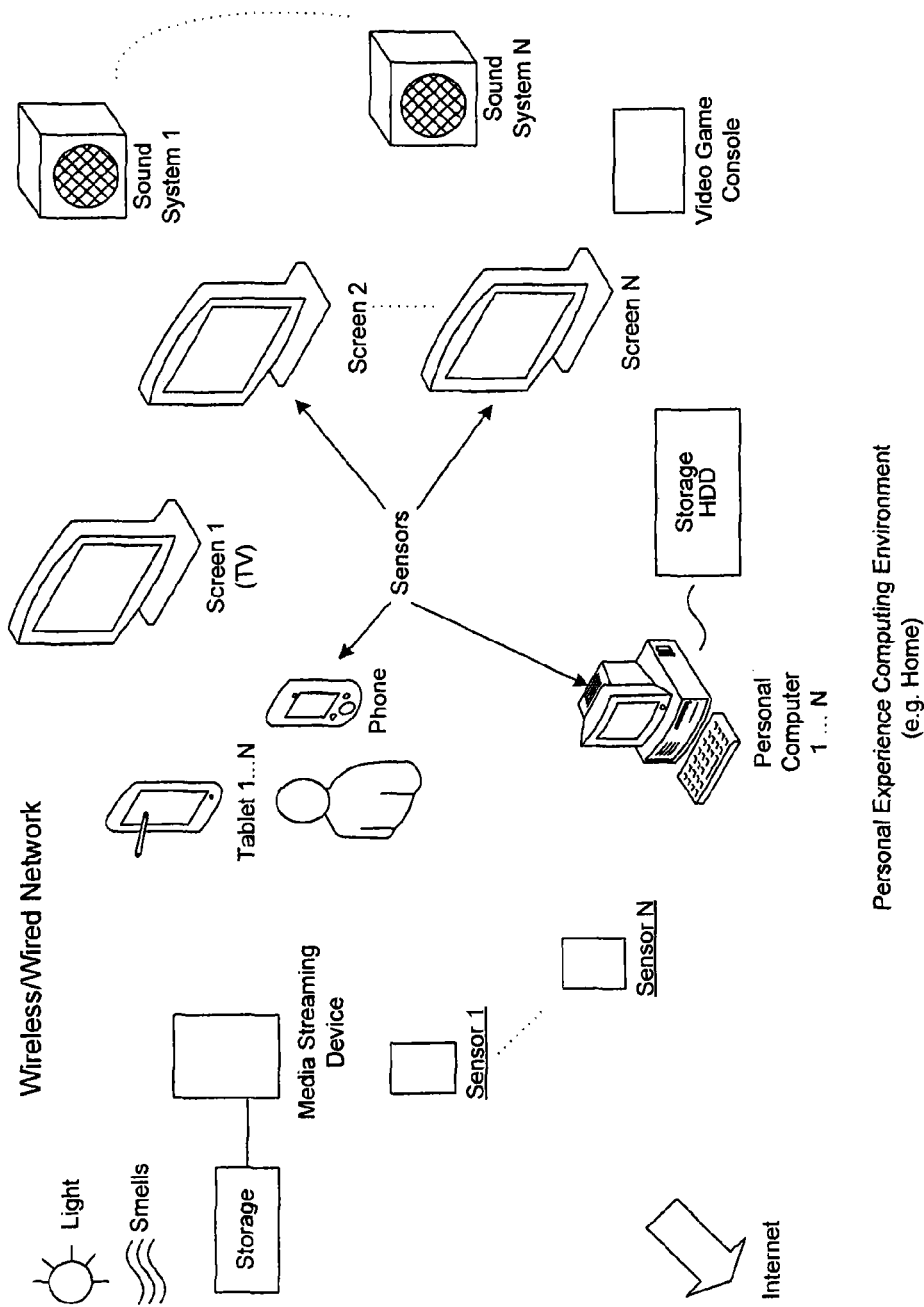
FIG. 2 is a block diagram of a personal experience computing environment.
Figure 3:
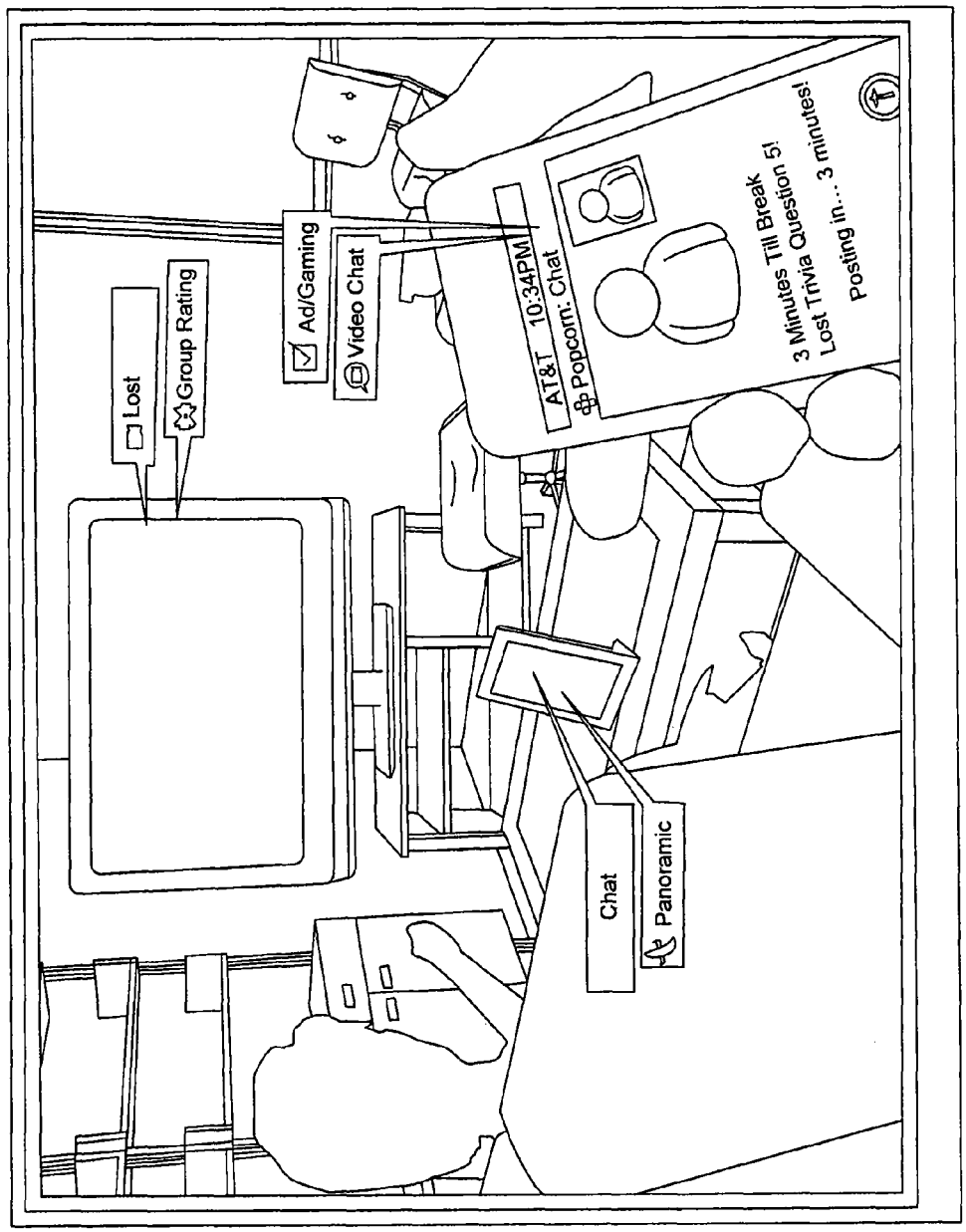
FIG. 3 illustrates an exemplary personal experience computing environment.
Figure 4:
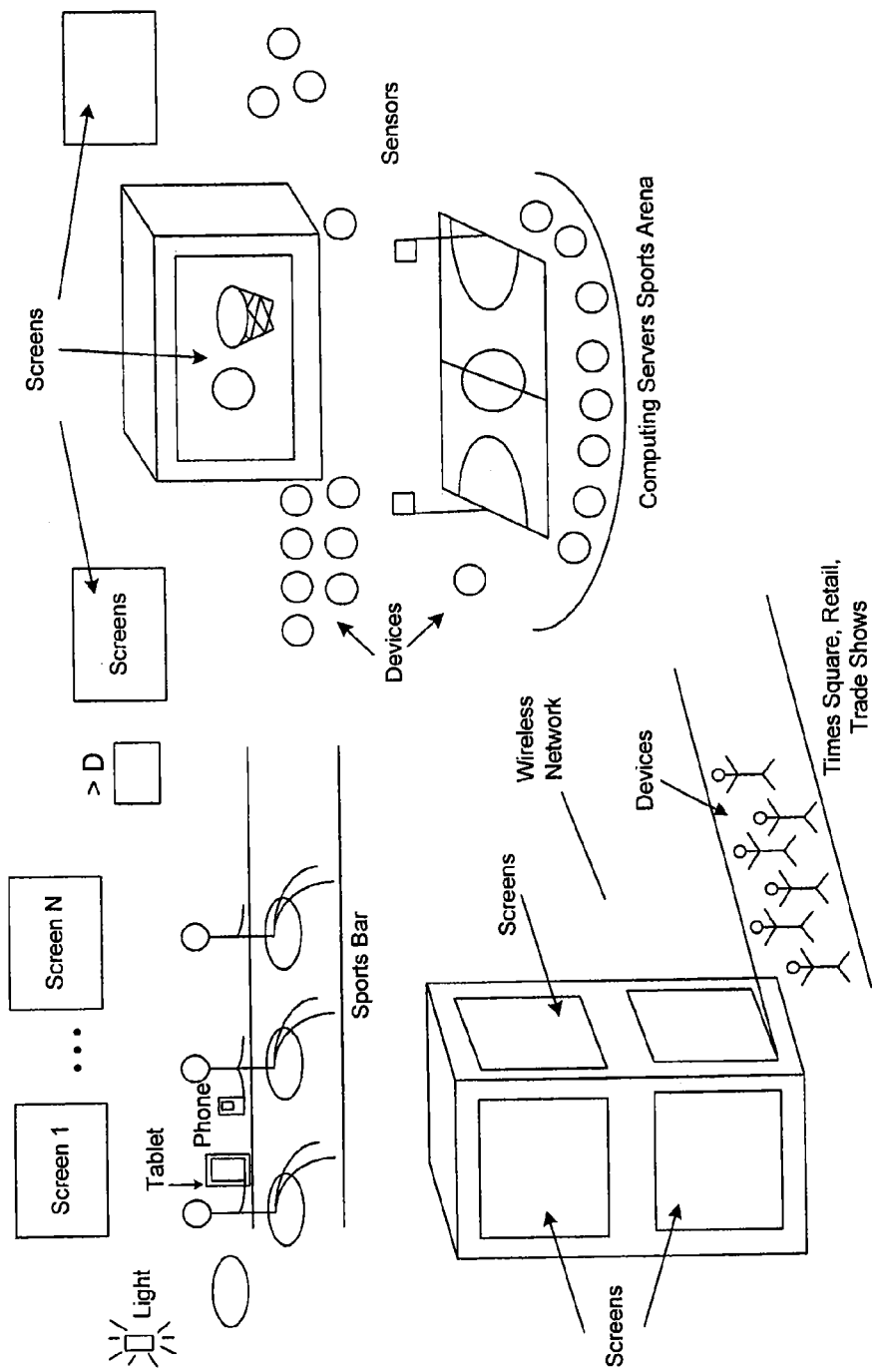
FIG. 4 is a block diagram of a public experience computing environment.
Figure 5:
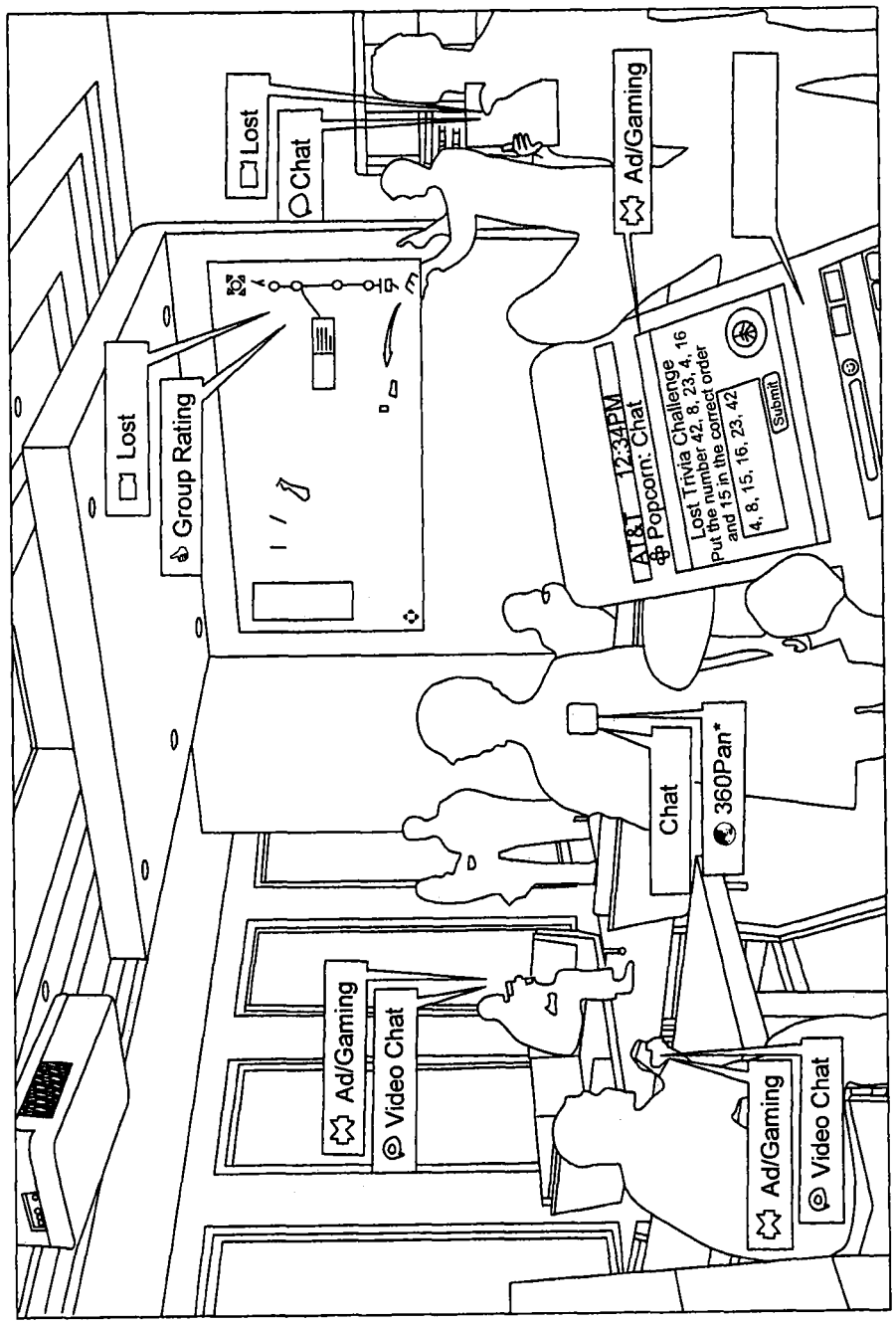
FIG. 5 illustrates an exemplary public experience computing environment.
Figure 6:
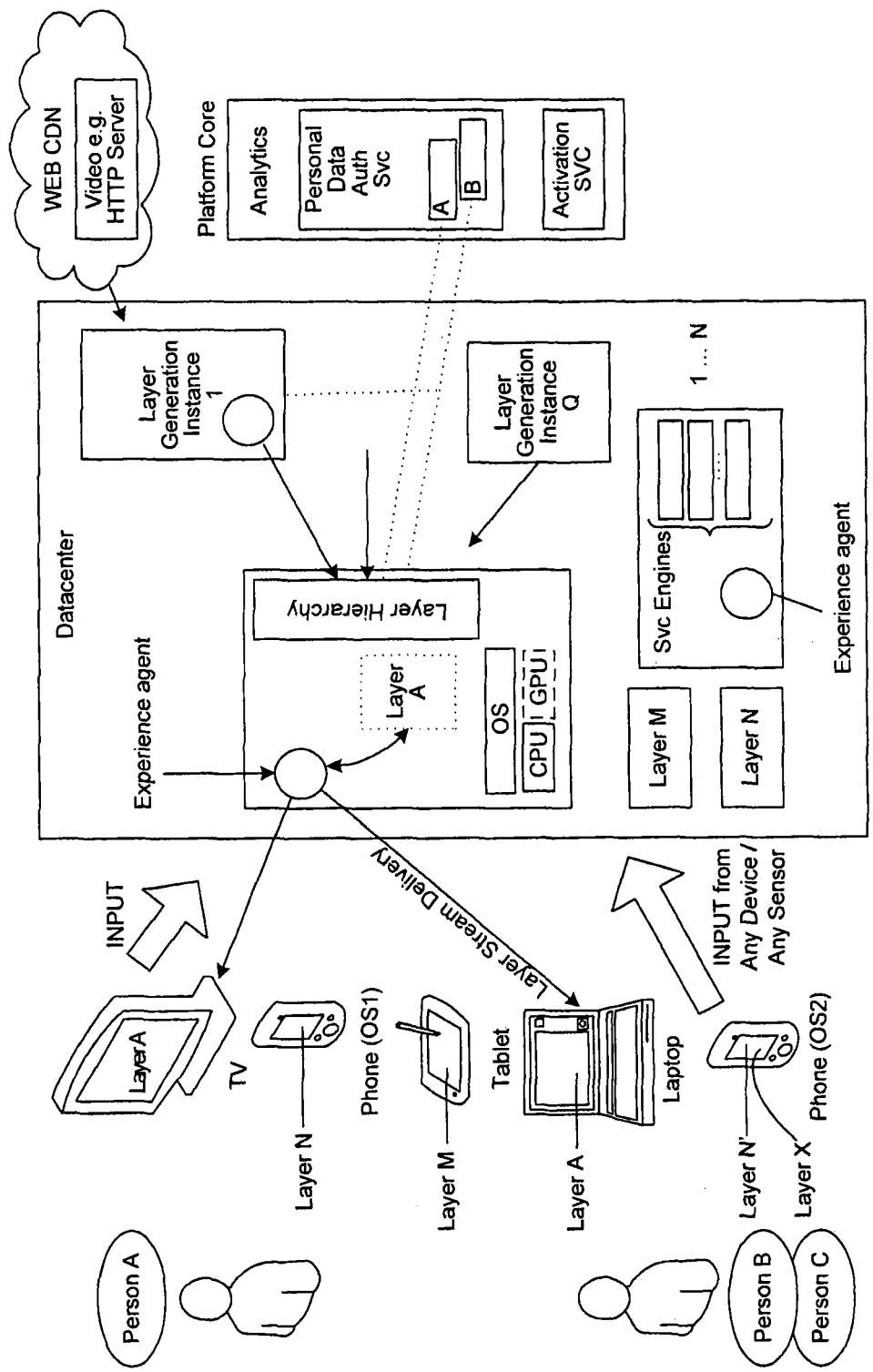
FIG. 6 illustrates an architecture of a capacity datacenter and a scenario of layer generation, splitting, remixing.
Figure 7:
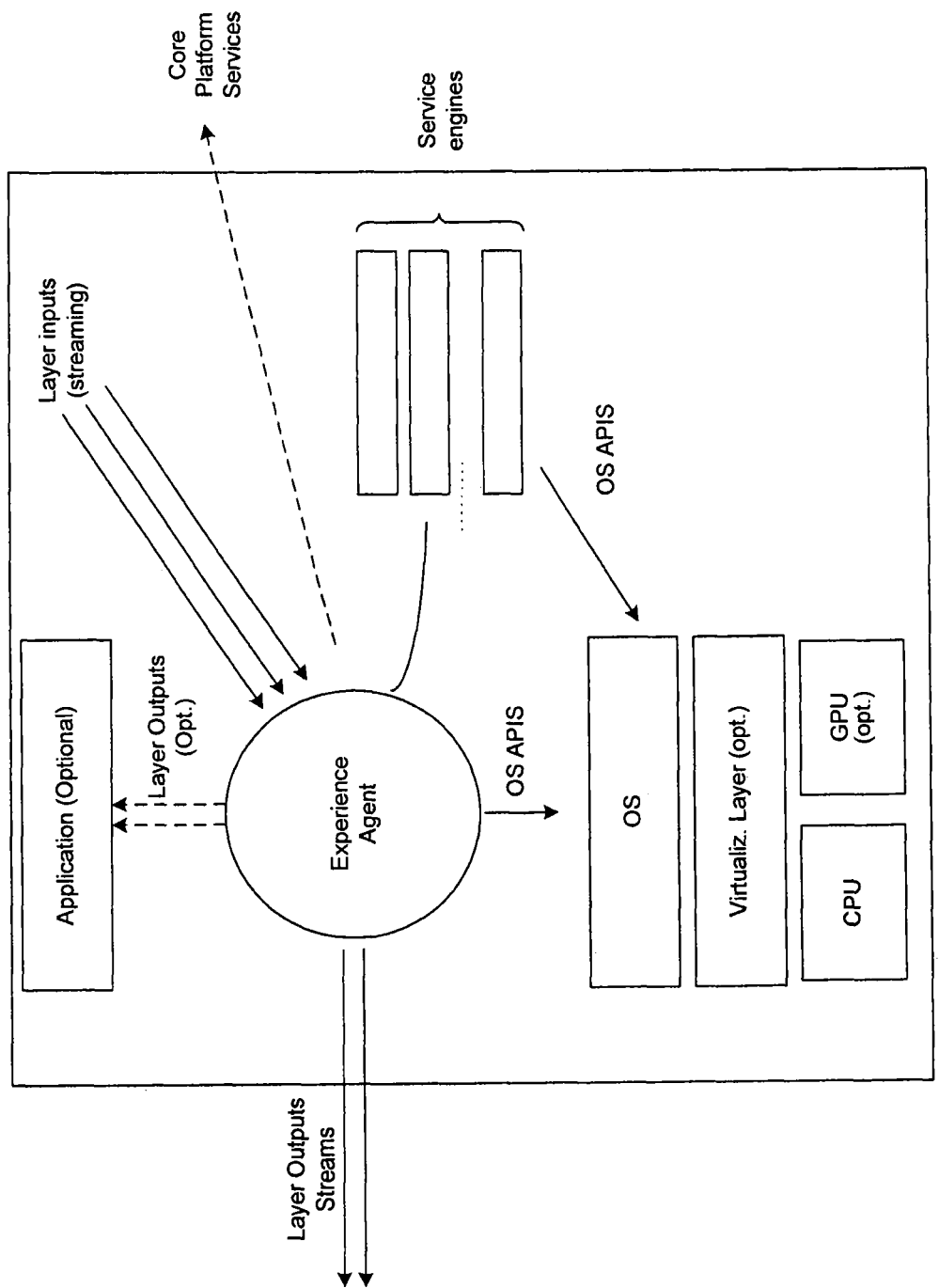
FIG. 7 illustrates an architecture of a computational node (server or device).
Figure 8:
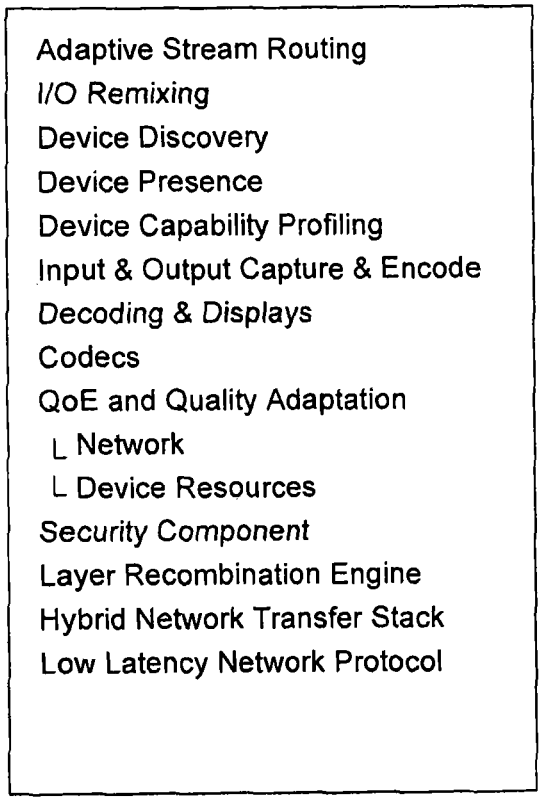
FIG. 8 illustrates the structure of an experience agent.

FIG. 2 is a block diagram of a personal experience computing environment. FIG. 3 illustrates an exemplary personal experience computing environment. FIG. 4 is a block diagram of a public experience computing environment. FIG. 5 illustrates an exemplary public experience computing environment. FIG. 6 illustrates an architecture of a capacity datacenter and a scenario of layer generation, splitting, remixing. FIG. 7 illustrates an architecture of a computational node (server or device). FIG. 8 illustrates the structure of an experience agent.

Figure 9:
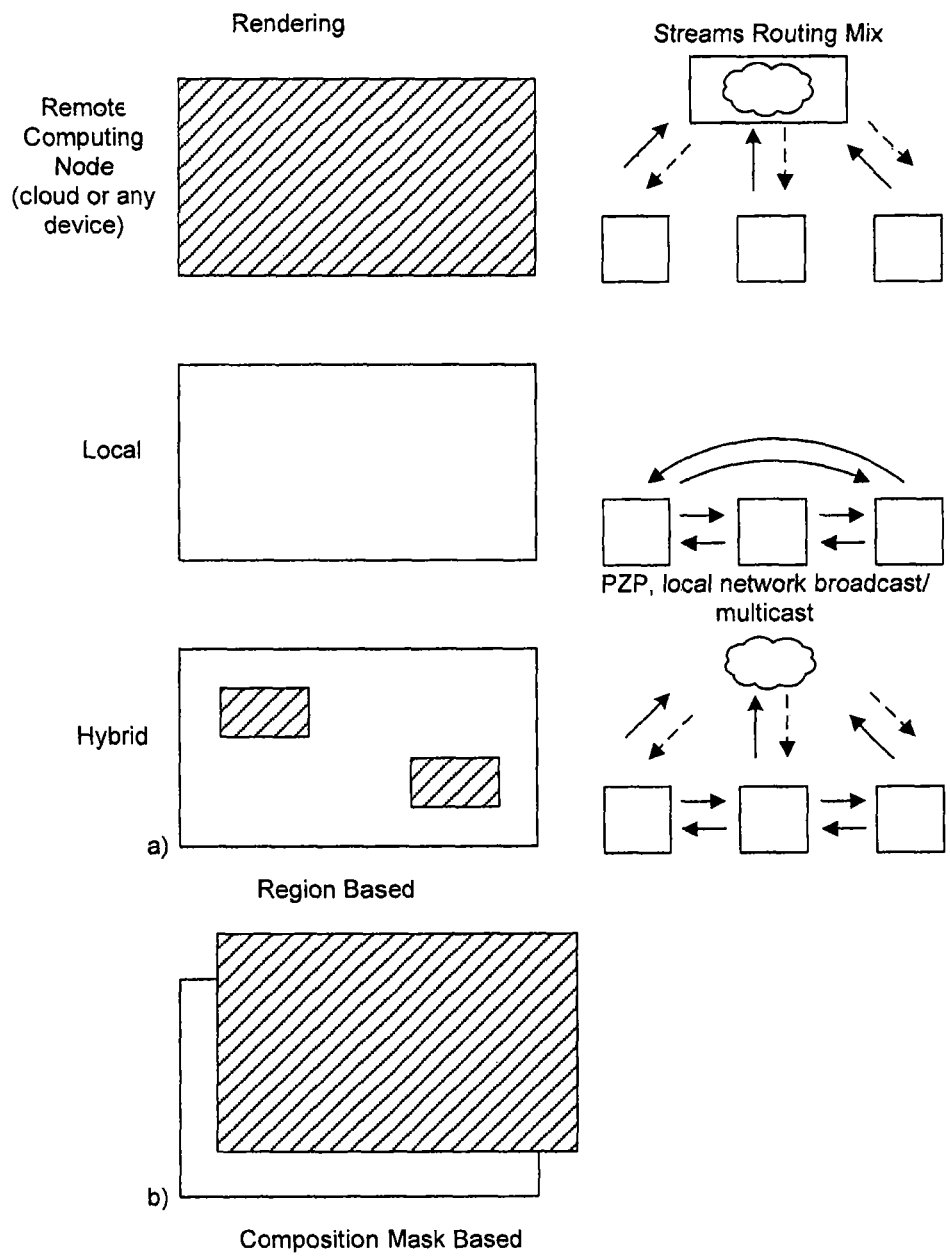
FIG. 9 depicts various layer types and data routing schemas.

FIG. 9 depicts various layer types and data routing schemas. FIG. 9 now illustrates a basic and illustrative example of an architecture of a local layer composition. In embodiments, there are four features relevant to the layers assist architecture. The first feature is layer composition. We will look a little above layer generation in our previous discussion about architecture, layer composition and generation. The second feature is layer mobility, which turns on how layers can be moved or shifted between devices, how they can be spilt, how the application can be split into multiple layers, how duplicate layers can create experiences that span multiple devices, etc. The third feature involves layer computation and data model and how such layers are routed. The fourth feature relates to layer outputs. Layer outputs relates to how layers produce outputs for other layers or for devices, how they take inputs from people or from other layers.

Figure 10:
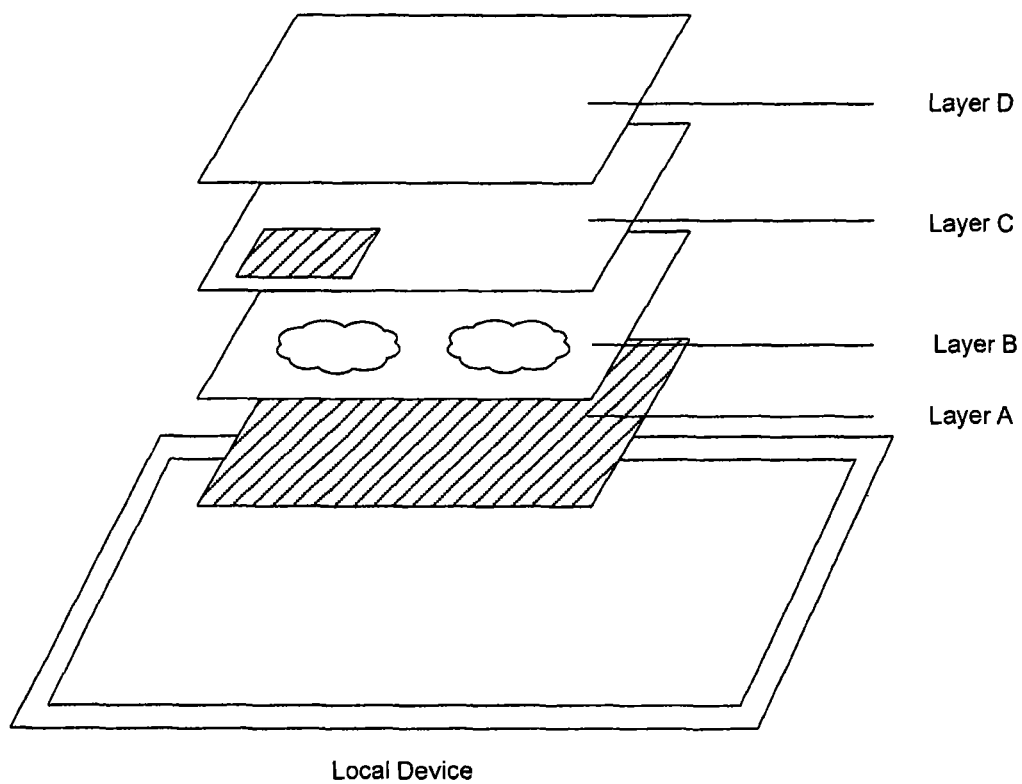
FIG. 10 illustrates an exemplary architecture of a local layer recombination (in this case—composition).
Figure 11:
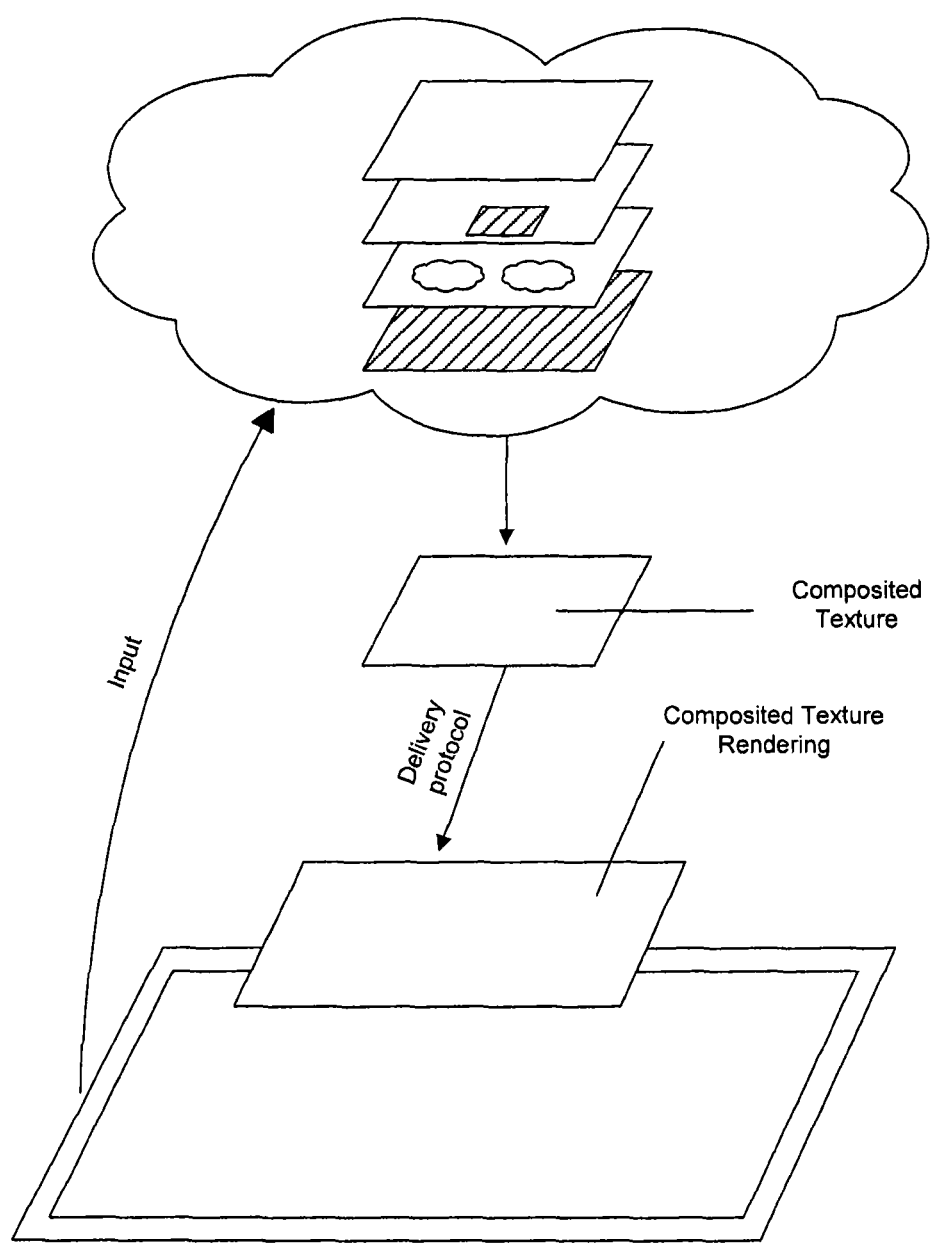
FIG. 11 illustrates cloud-level layer recombination (composition).

Layer Composition: The first, layer composition, is described herein with reference to FIGS. 10 and 11. These figures illustrate, as an example, a tablet and layers associated therewith. In embodiments, layers may be composed using one or a combination of two different models—a local device composition and cloud or other such remote layer composition. In some instances, the layers may be composed in any way or order to result in a sequence of layers (e.g., where the layers are arranged one on top of each other). In such examples, layers may be composed using different levels of transparency, scaling, and such parameters may be reconfigured on the fly. In the case of a local setting, as is the case in FIG. 10, the layer may have a predefined schema that can be defined by the application, but still not limited to such a definition. In some instances, the layers or the predefined definitions can be dynamically rearranged. So the first layer is at the bottom, as exemplarily illustrated in FIG. 10. The next layer rendered on top of it and may be, for example, mixed using a GPU of the local computing device or other capabilities of the device. As illustrated herein, layer composition happens dynamically on the device. In the cloud layer composition or the remote layer composition, as exemplarily illustrated in FIG. 11, a similar construction happens on a remote site or device. Such a mechanism may be useful when a local device does not have complete capability to render one or more of the layers. This may be done dynamically when the local device's resources are unable to handle the composition or just be done remotely as preferred by a user. Any permutation of computations as may be envisioned by a person of ordinary skill in the art may also additionally be utilized.

Figure 15:
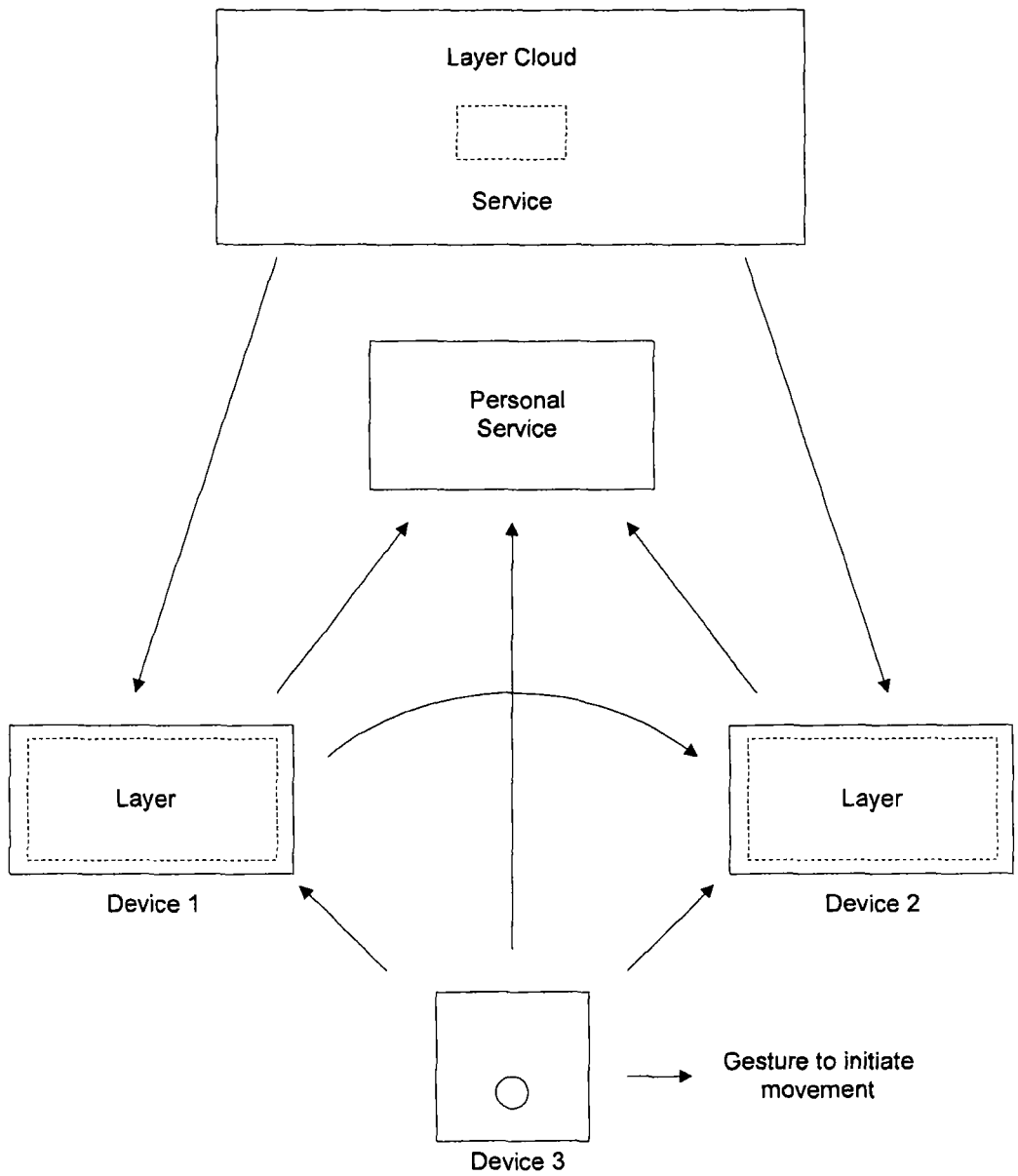
FIG. 15 illustrates a block diagram for layer movement, duplication across devices.

Layer Mobility: The next feature is the mobility and the ability of the layer to move across devices and, for example, be present simultaneously across different consumer devices. In embodiments, such mobility allow for flare virtualization across the devices. Layer mobility is further discussed with reference to FIG. 15. In the illustrated embodiment, three exemplary devices are shown—device 1, device 2 and device 3. In an exemplary embodiment involving device 1 and device 2, a first layer generated on the first device. Consider a scenario where an experience is generated and functional, and then a person associated with device 3 initiates a gesture or other trigger or input method to cause an event to occur. In such a scenario, device 3 may talk to device 1 or it may directly talk to a personal service. Personal and consideration service is part of the platform that holds all of the integration configuration data for specific people and knows exactly all the available information about how many devices does it have, what networks do they have working on and all the parameters. Accordingly, this can be identified dynamically so the personal service is constantly talking to each device and send out the routing mechanism.

Consider, for instance, that in the above example all three devices are located in the network. Once the device connected to the personal service, personal service can send the device (or each device) this information so in local network they can communicate to each other and they can just simply establish direct links and initiate all this movement and other operations by conveying personal service. Another example is where the devices are located in the same geographical location but just connected to different WIFI or wired networks and there is no direct link. Here, the devices would instead communicate through the personal service. Anyway, regardless of this mechanism, the end result will be the device 3 initiates the signal both to destination device (in this case device 2), and the source device. It basically informs the device that they should prepare for layered movement. They, those who communicate through the service wishes according service to this layer. As an additional example, let's say we have some layer created in the cloud. In this case, device number 3 tells device number 2 to accept the specific request which indicate a particular layer, and device number 1 will be ready for layer movement. This device can talk to each other to accept and to identify how layer movement is progressing. The devices may synchronize the animation between device 1 and device 2, how the layer disappears on the first and appears on the second device. And finally the layer on device 1 moves to device number 2. The important part is both devices are connected to the service which is responsible for work under this layer, so this communication, this transmission can happen in either direction. As far as the layer is concerned, the same mechanism can be applied from layer application—it just simply communicates to according service in the cloud to send identical or device specific stream which contains this layer to another device. The layer movement feature is important because if an application is composed of multiple layers, layers can be split so one layer can go on the tablet device and another layer can go on the TV device and they can adapt based on the devices and this allows for experiences that can be split across devices.

Layer Computation: The next feature is the computation model of the layer, where all the computation for this layer happens and the data exchange mechanism for this layer. Reference is made to FIG. 9 which introduces an exemplary architecture and structure. The first layer, in this example, may be complete configured in the cloud (this is the top left corner). In this case layer can be completely generated within the cloud. It can be a remote application generated on the cloud server and the game or application working completely there and fully computer generated and work in normal mode. Using remote delivery mechanisms, the game or application may then be captured and delivered to the cloud. In other examples, it is understood that the application can be generated locally using capabilities the devices has. In examples, where the layer can be generated simultaneously, part of this layer can be generated on the cloud and part of the layer can be generated locally on the device. Generated in the cloud may include any computational resource remotely or locally available. So let's say you have two devices in your physical location, mobile phone and powerful computer, and you are using mostly your phone and layer can be generate part of the layer, specific to the phone, can be generated on the phone like control button, touch events and touch controls. But the other part can be generated (let's say we consider map application and powerful machine can render 3D map) and just have the information sent to the device. "Cloud" implies another computational unit regardless of its location and other parameters. The interesting part of this is a hybrid layer under part of the layer generated locally and part of layer generated remotely. In embodiments, this can be region-based which is simple model so part of the layer just local and part of the layer generate and delivered to the regions. It could be based on the mask so let's say we have generated two pictures and they can mix with different types of transparency and work very well even when there is a lot of movement. In this case a computational-mask based approach may be utilized so one part of the layer generated locally and the other part in the cloud and are then mixed together in the device.

Data layers may be sent as data streams and event streams that can be, for example, transmitted through the cloud. In embodiments, each layer transmits to a remote computing node all the data and communicates only to that node. In some examples, each layer, and further in some examples, each instance of such layers, may work exactly on the same model so as to offer a central point of communication that is publicly accessible through good bandwidths and other network capabilities. This exemplary embodiment offers a single point of routing. In other embodiments, a "peering network" may be used, where devices talk with each other for such communication offerings. In a third embodiment, a possible approach is combination of the two previous approaches, e.g., in a scenario where we have three persons located, and each of the persons has three devices. Each device is located, for example, in the same wi-fi network, so the devices can communicate locally, but when it comes to communication across the local network the cloud model may be adopted.

Figure 16:
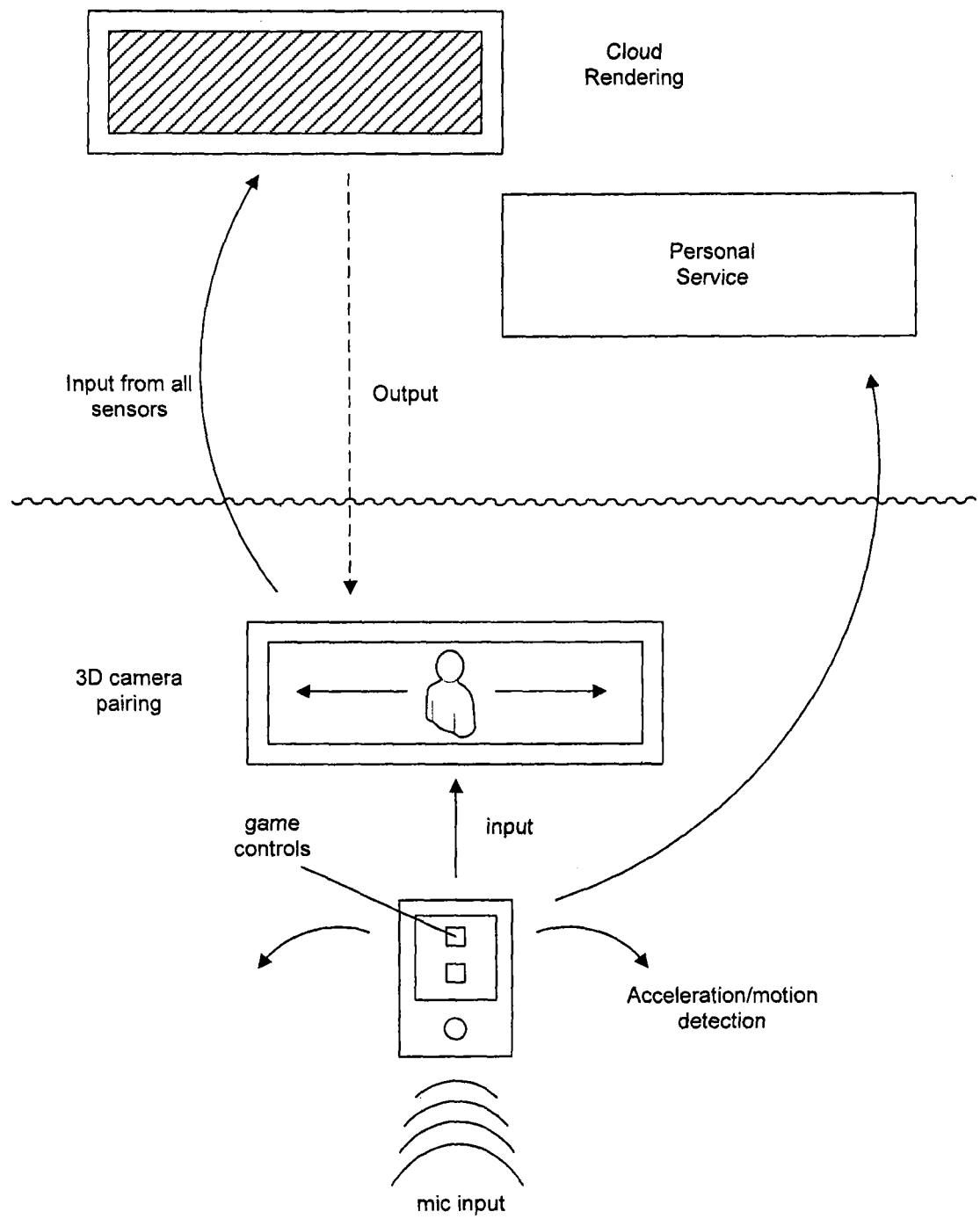
FIG. 16 illustrates layer multiple inputs to a layer from multiple devices and affecting a cloud-based layer.
Figure 17:
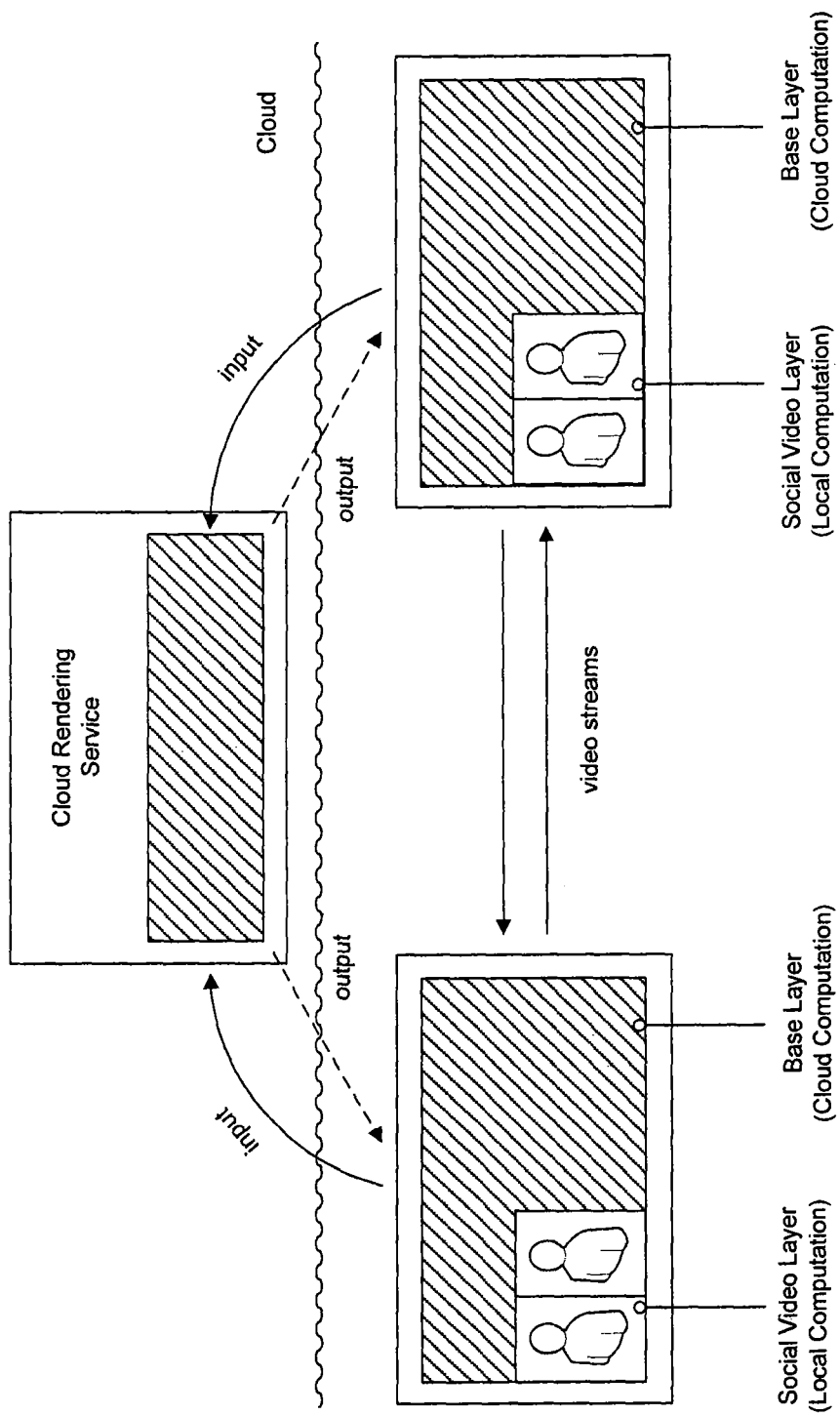
FIG. 17 illustrates a block diagram of mixing cloud-rendered layer with social video layer.
Figure 18:
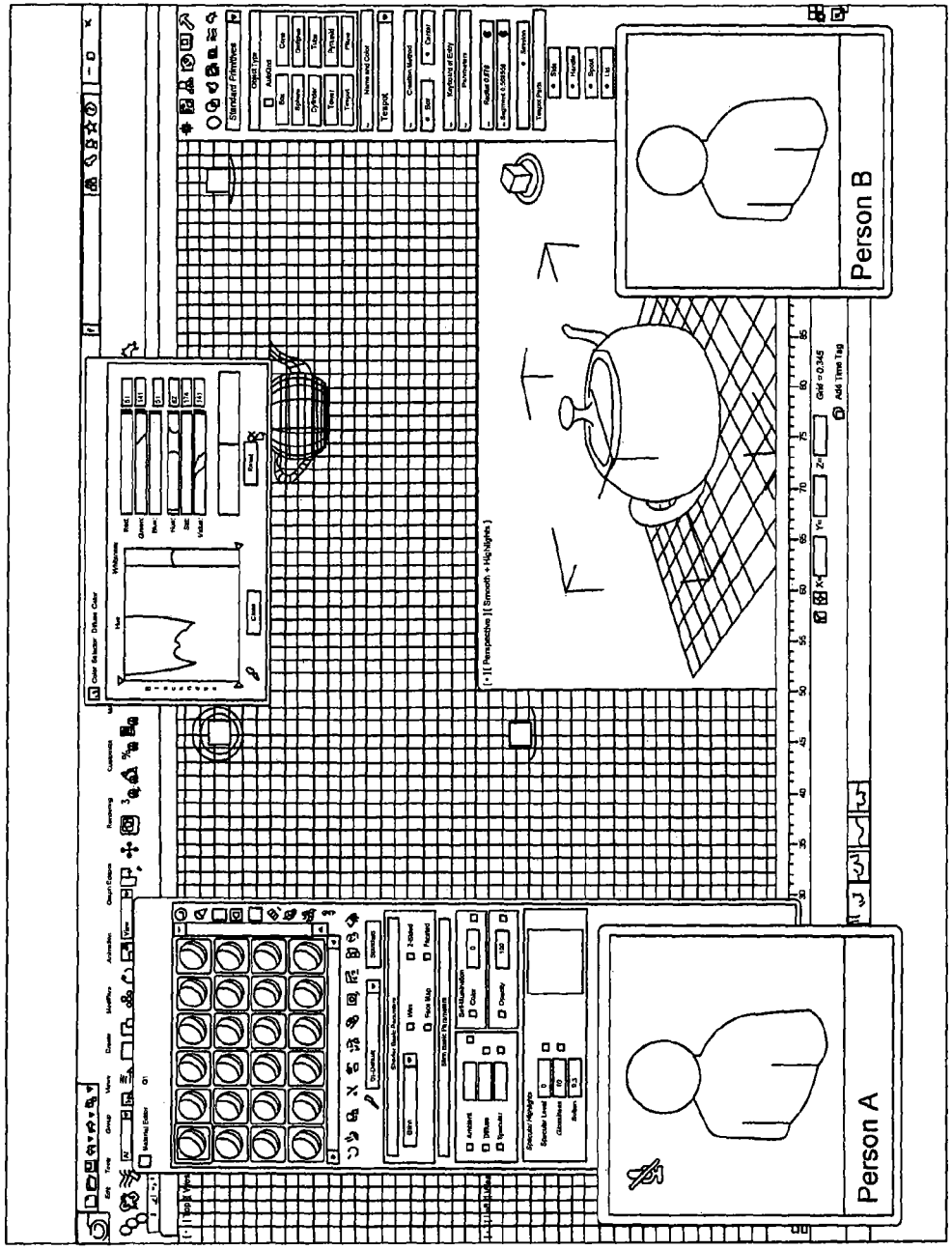
FIG. 18 illustrates an example of mixing cloud-rendered application layer with social video layer.
Figure 19:
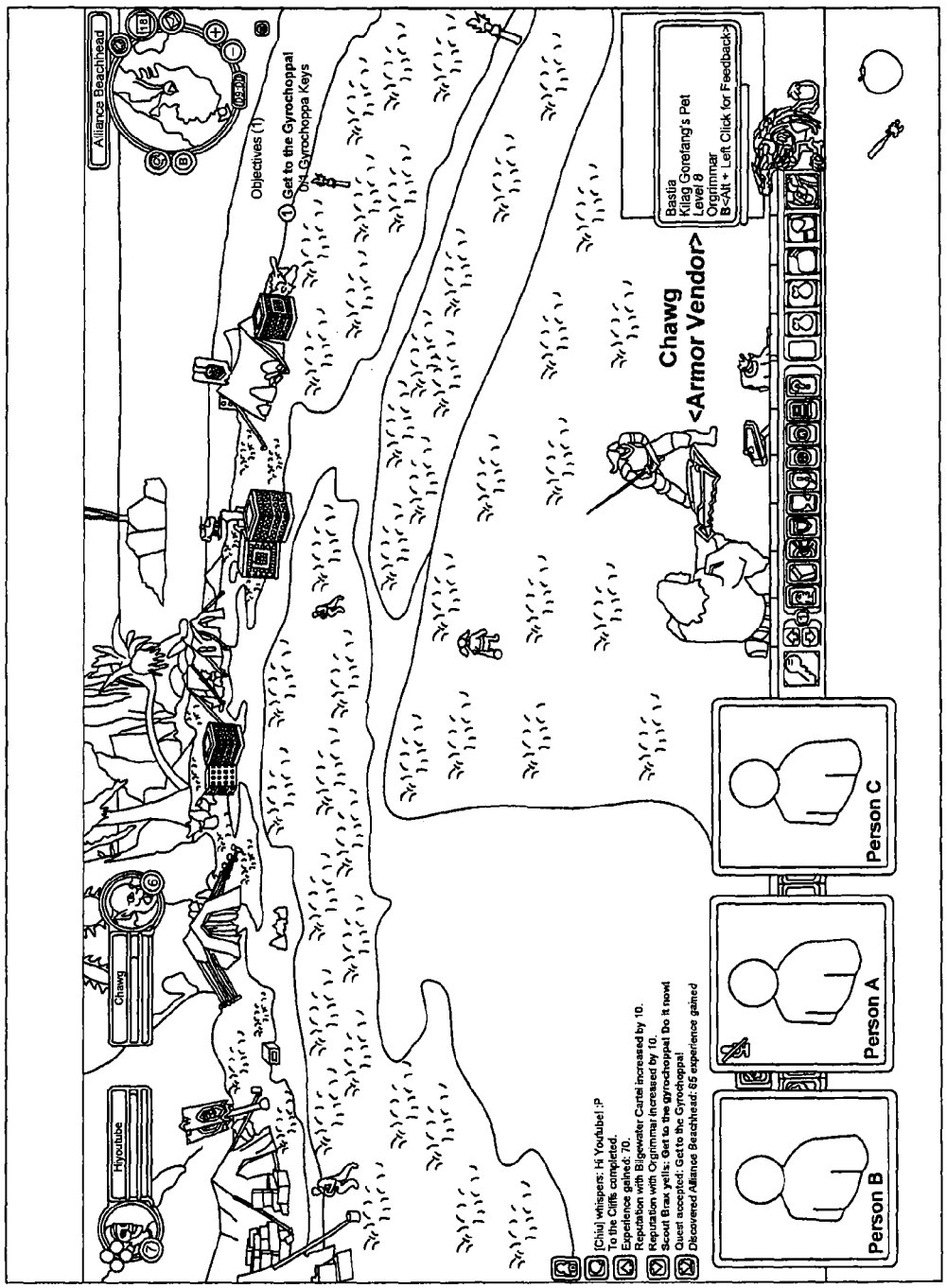
FIG. 19 illustrates an example of mixing cloud rendered game layer with social video layer.
Figure 20:
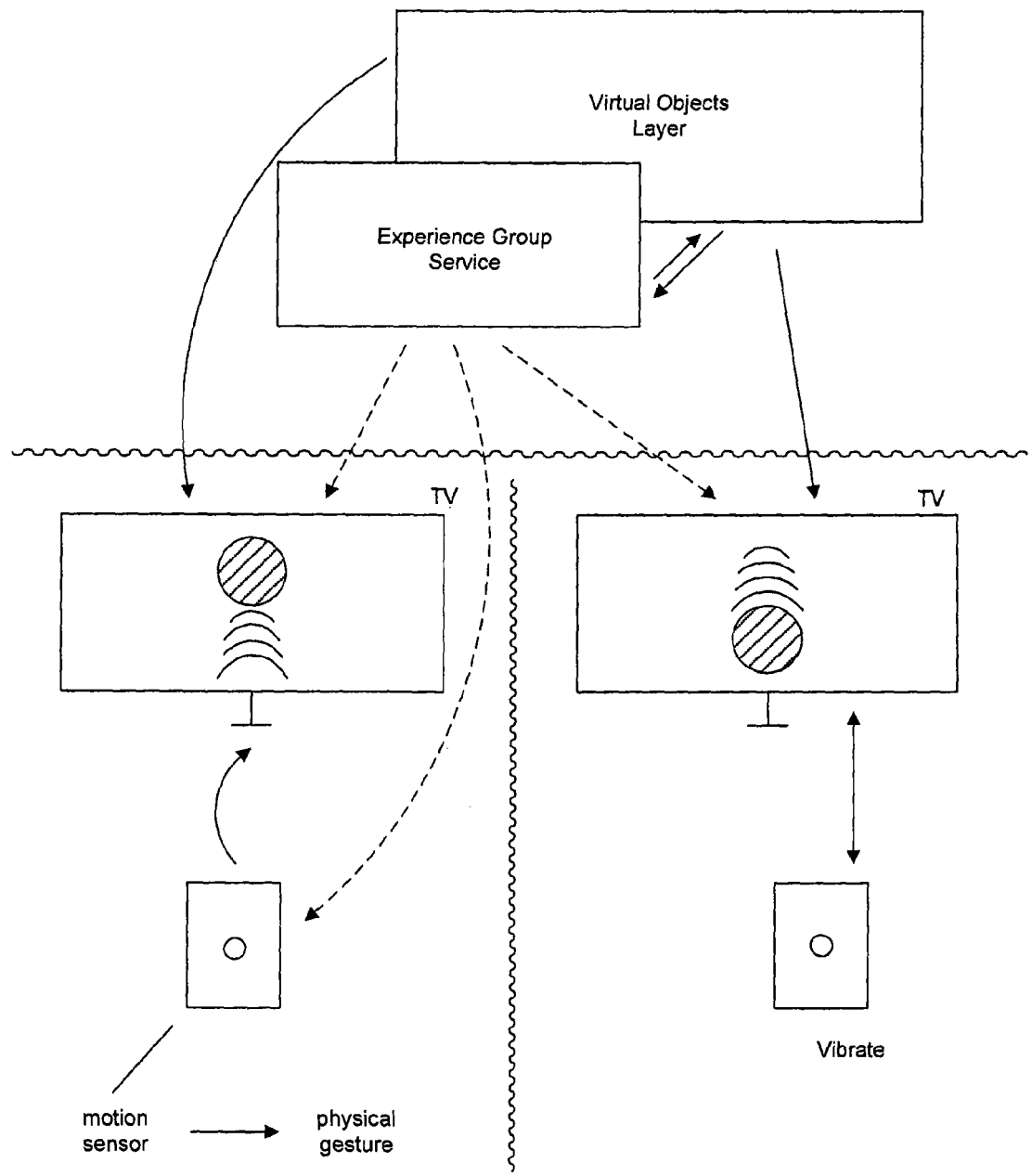
FIG. 20 illustrates a block diagram of an exemplary layer interaction (virtual experience).
Figure 21:
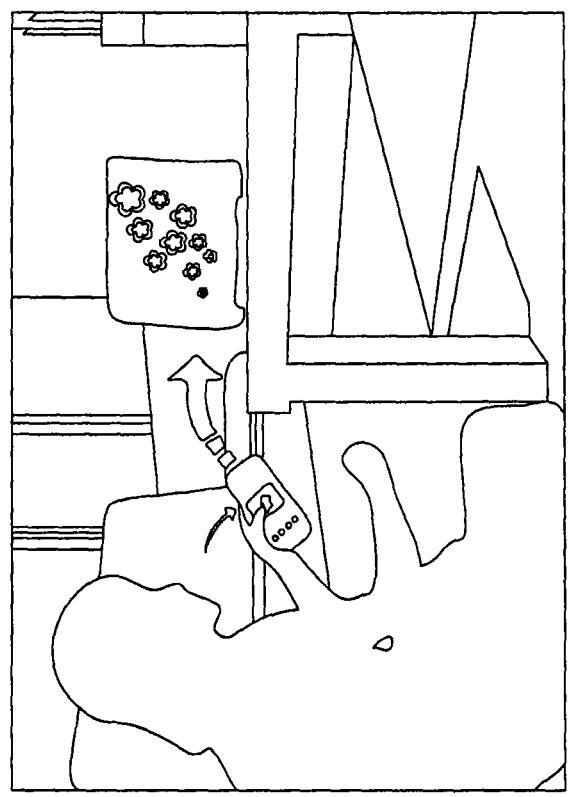
FIG. 21 illustrates an exemplary user interaction and layer interface (virtual experience).
Figure 22:
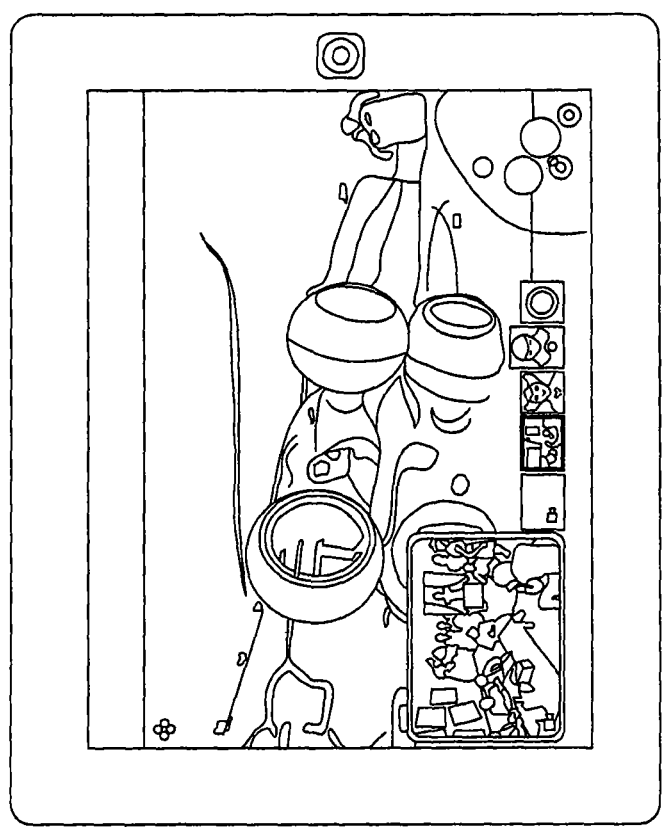
FIG. 22 illustrate an exemplary "swell" layer.
Figure 23:
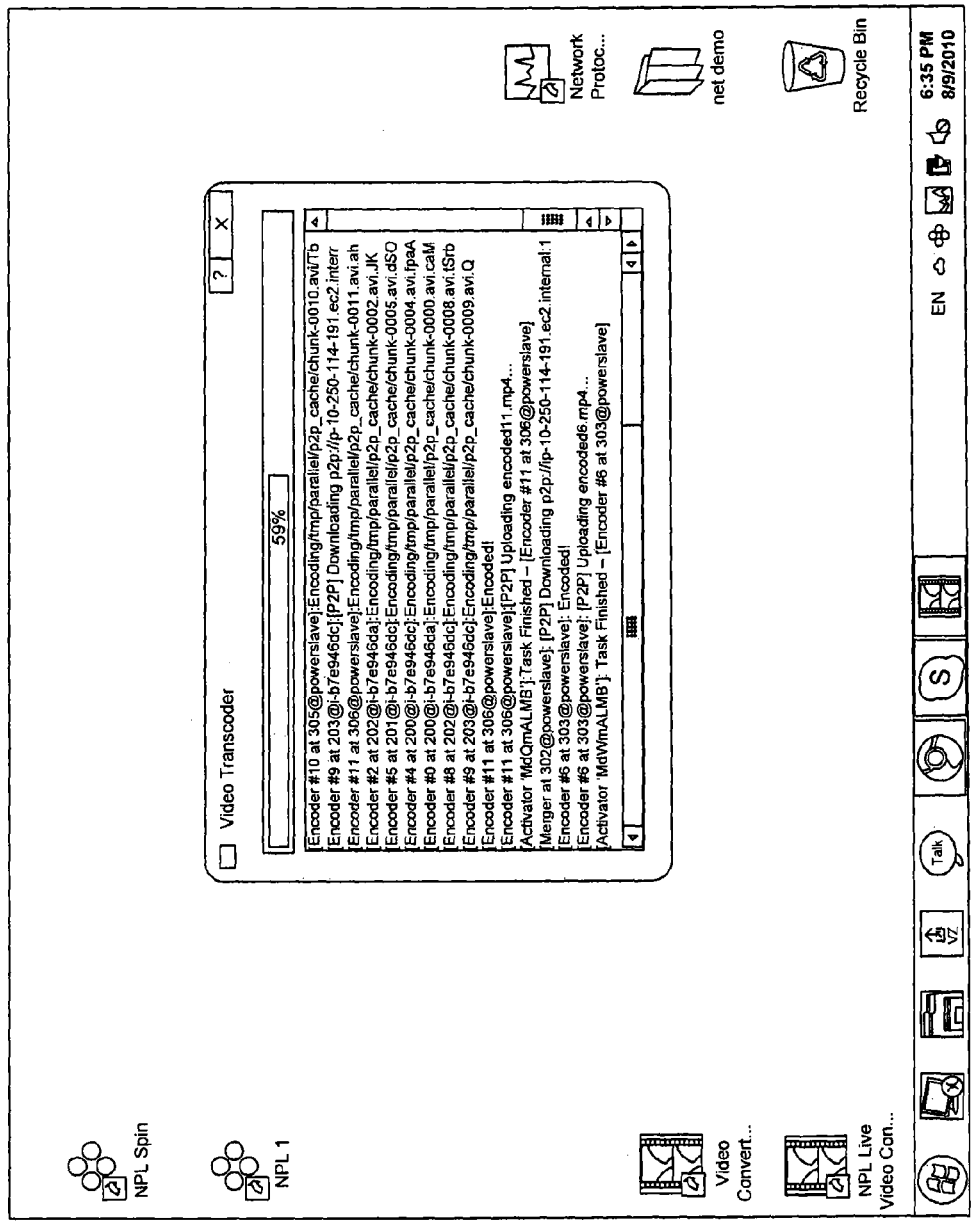
Figure 25:
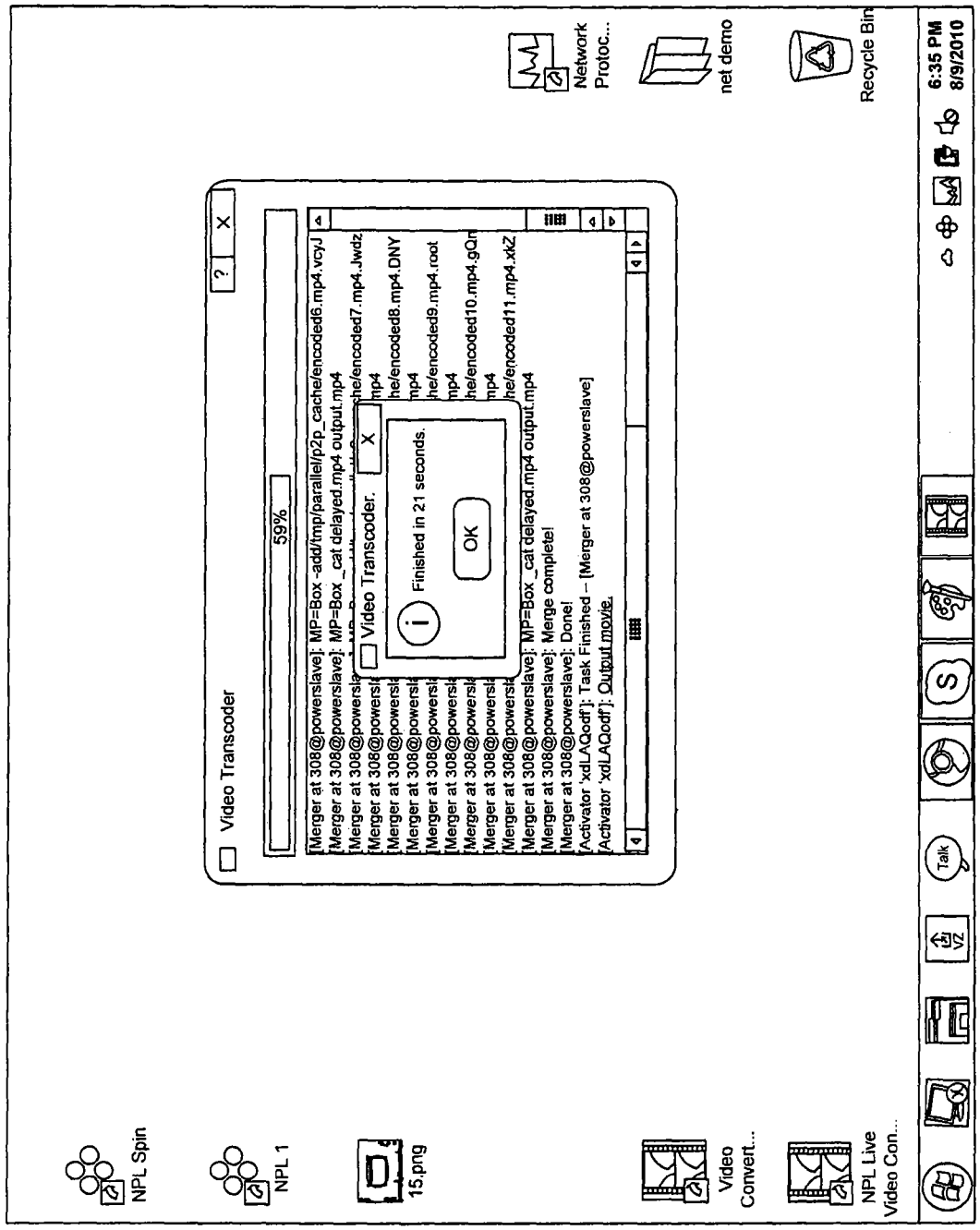

Layer Outputs: FIG. 16 now illustrates i/o, input and output for layers. So layers can accept inputs from other layers or from people and generic outputs so they can be re-combined. The illustrated example describes input/output cases. FIG. 16 illustrates a multi-device, multi-layer embodiment. Let's consider an exemplary embodiment where we have television and mobile phone, and we have a game which is regularly on TV. Let's say it's a first shooter game. This game may be controlled using your mobile phone so you can rotate, 3D pan in 360 degrees, use a camera, etc. When a gesture or any other type of input is provide, for example, let's say it initiates a movement in the game. And also you can see alternatively for you from your mobile phone. So let's say you can see the map of the game on the mobile phone while you see the main view on the big screen TV. This is a specific example but let's consider how it can be done through the Layer Model. We have game, or specific layer, executed somewhere, either remotely or locally on the device, on one device. And we have another device which talks and gives to the personal service or configuration service which gets this information routes and schemes and it spans this direct connection between two devices. The layers accept both from two devices, so a user can play using the native device (e.g., the mobile device), or could also play using the TV (assuming TV has input mechanisms such as a keyboard). The user can play from that keyboard ans also the other device since the input information to this layer, depending on the layer of the routes and schemes. Accordingly, in embodiments, the information may be directly sent to the device or through the cloud depending on the layer computational model. This second device can send data to direct it to the local device where layer originated or directed to the cloud part which layer computation or to them both.

In this illustrated scenario, the conveyed idea is that even if the game or application or layer wasn't designed for that such type of an input, it can be meta-schema implemented to be able to work with such type of input. So, without any modification to the layer or application agent, and with just a configuration file which basically establishes the map between the input and parameters of the unit to the application specific actions, the required objectives are easily met. In another example, we have a PC based game and it knows how to react to the mouse movement, but then we add an accelerated method from the mobile phone and we can just simply map the rotation of the view of the main character in the game to accelerated motion of the phone. So when a user rotates the phone, it will rotate the main view. This illustrates how this schema is important to extend input capabilities for initial application layers.

Figure 12:
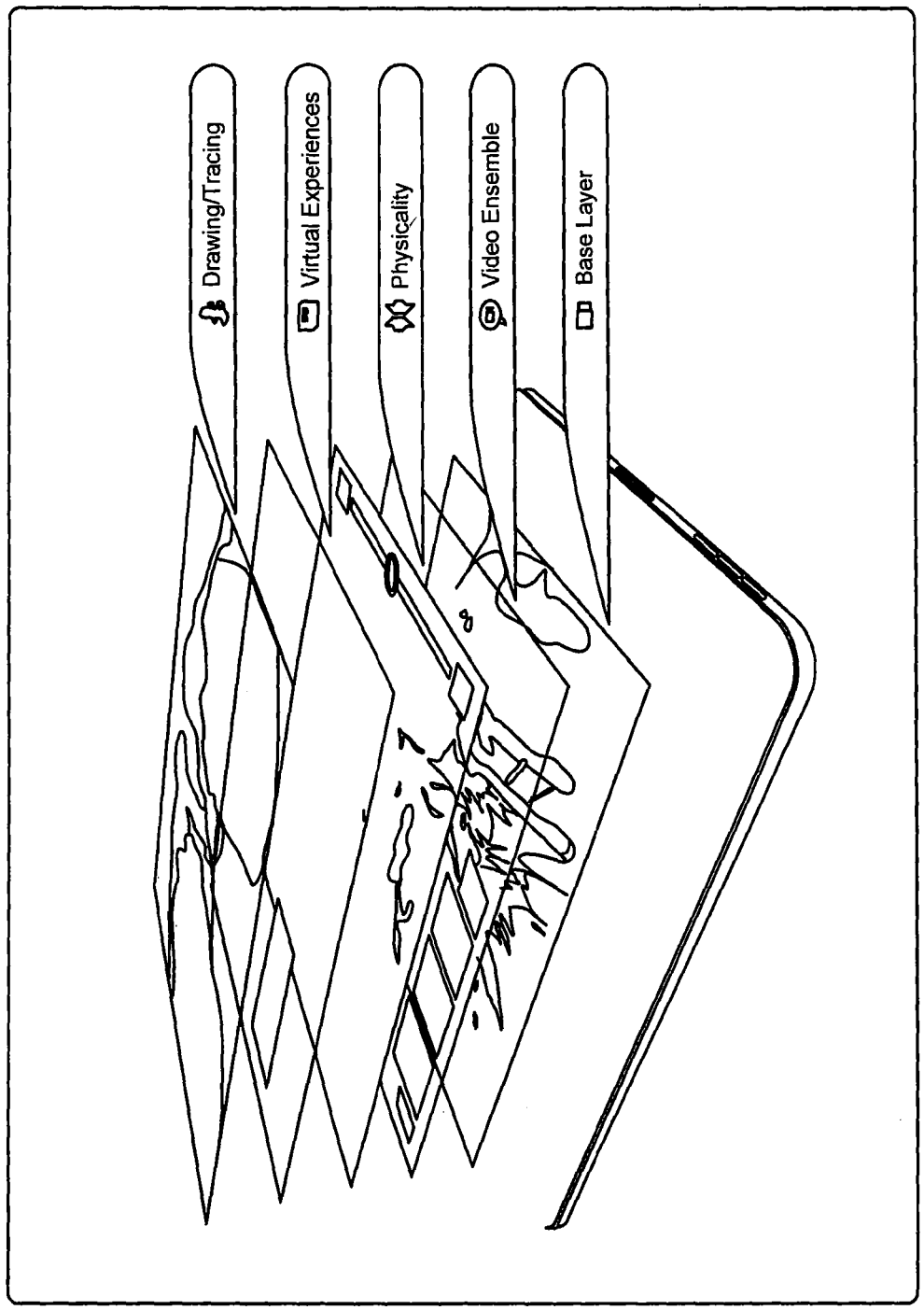
FIG. 12 illustrates an exemplary specific layer recombination (composition).
Figure 13:
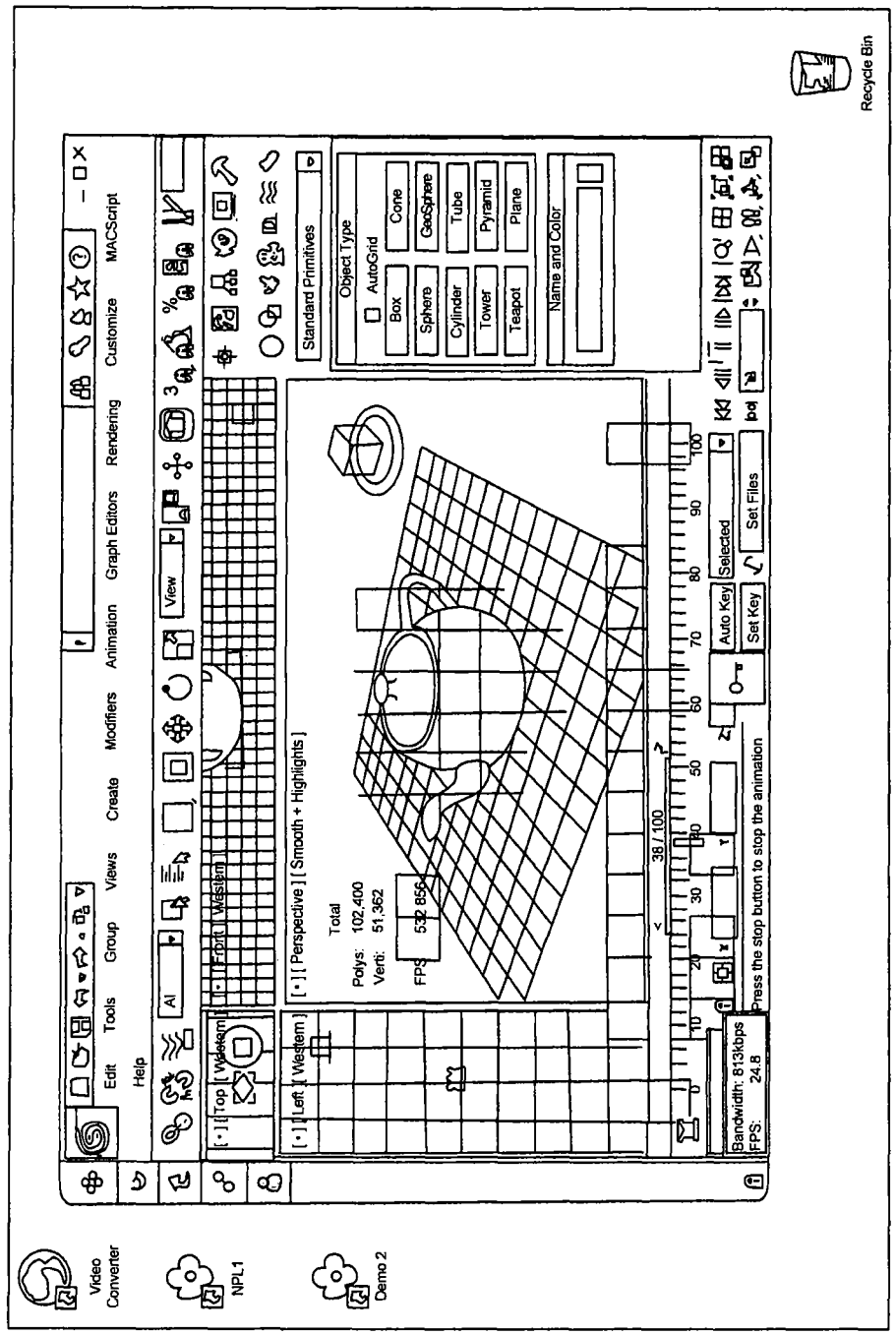
FIG. 13 illustrates an exemplary cloud-level layer recombination (composition).
Figure 14:
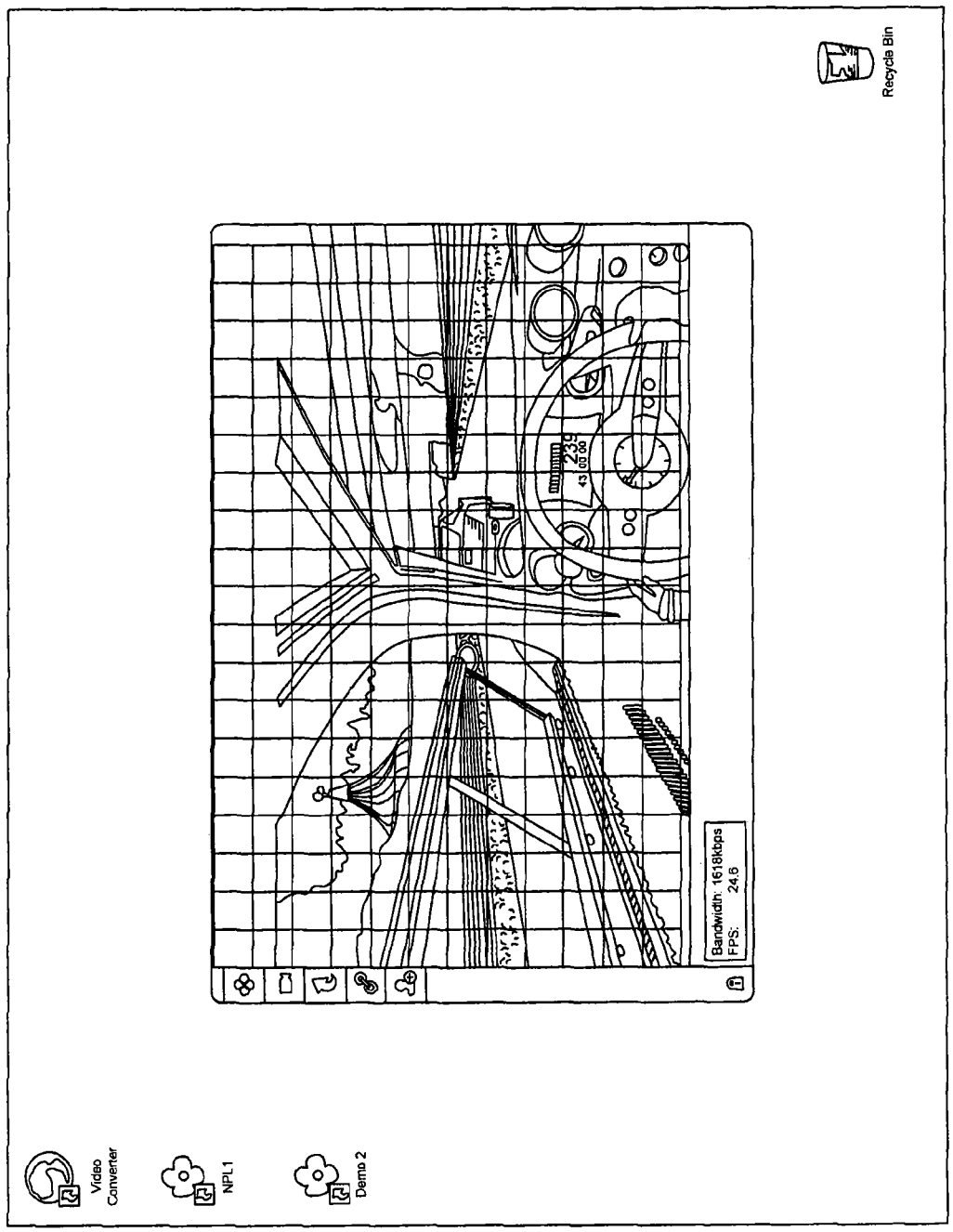
FIG. 14 illustrates an exemplary cloud-level layer recombination (composition).

FIGS. 12-14 above depict very basic and nascent illustrations of experiences that utilize the local layer composition principles discussed above. For example, FIGS. 12 and 13 provide basic examples of experiences showing 4 illustrative layers. In embodiments, a first layer is generated by Autodesk 3ds Max (FIG. 4) or EA's "Need for Speed" instantiated on an experience server (this is a platform service that transforms an existing windows application as a layer). In some instances, a second layer is an interactive frame around the 3ds Max layer, and in this example is generated on a client device by an experience agent. Similarly, for example, a third layer is the black box in the bottom-left corner with the text "FPS" and "bandwidth", and is generated on the client device but pulls data by accessing a service engine available on the service platform. The fourth layer is a red-green-yellow grid which demonstrates technical information (e.g., different regions being selectively encoded) and is generated and computed on the service platform, and then merged with the 3ds Max layer on the experience server. In the example on FIG. 13. a layer generated by Microsoft PowerPoint application is locally combined with a simple video chat layer employing p2p stream routing model.

FIGS. 4-5 provide an example experience showing 4 layers. A first layer is generated Autodesk 3ds Max instantiated on a suitable layer source, such as on an experience server or a content server. A second layer is an interactive frame around the 3ds Max layer, and in this example is generated on a client device by an experience agent. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of the low-latency transfer protocol (e.g., different regions being selectively encoded) and is generated and computed on the service platform, and then merged with the 3ds Max layer on the experience server.

FIGS. 6-7, similar to FIGS. 4-5, show four layers, but in this case instead of a 3ds Max base layer, a first layer is generated by piece of code developed by EA and called "Need for Speed." A second layer is an interactive frame around the Need for Speed layer, and may be generated on a client device by an experience agent, on the service platform, or on the experience platform. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of the low-latency transfer protocol (e.g., different regions being selectively encoded) and is generated and computed on the service platform, and then merged with the Need for Speed layer on the experience server.

FIGS. 8-9 illustrate a base layer being a movie with DRM protection provided by iTunes/Apple iTunes store, the base layer here being provided by a video server, and merged on the experience platform.

FIGS. 21-25 show a demonstration of a video transcoding service utilized by the transcoding application, and incorporating a third-party service. Implementation of the transcoding service can be built, for example, on top of Amazon Web Services. In particular, this illustrates distributing the video transcoding service over a plurality of virtual machines instantiated by the third-party service.

Figure 26:
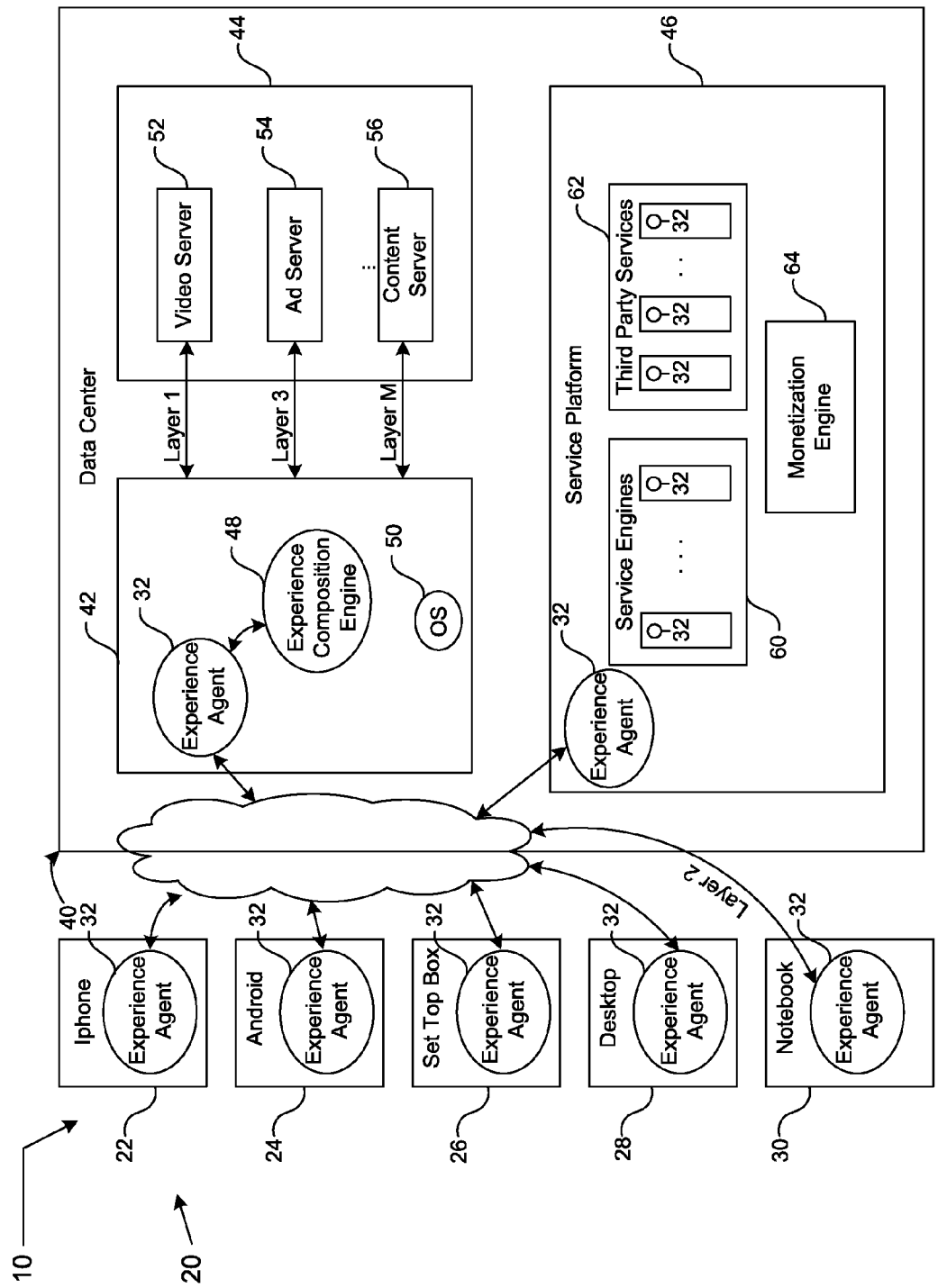
FIG. 26 illustrates another general system architecture for the experience platform.

Turning back to FIG. 26, the experience platform 10 includes a plurality of devices 20 and a data center 40. The devices 12 may include devices such as an iPhone 22, an android 24, a set top box 26, a desktop computer 28, and a netbook 30. At least some of the devices 12 may be located in proximity with each other and coupled via a wireless network. In certain embodiments, a participant utilizes multiple devices 12 to enjoy a heterogeneous experience, such as using the iPhone 22 to control operation of the other devices. Multiple participants may also share devices at one location, or the devices may be distributed across various locations for different participants.

Each device 12 has an experience agent 32. The experience agent 32 includes a sentio codec and an API. The sentio codec and the API enable the experience agent 32 to communicate with and request services of the components of the data center 40. The experience agent 32 facilitates direct interaction between other local devices. Because of the multi-dimensional aspect of the experience, the sentio codec and API are required to fully enable the desired experience. However, the functionality of the experience agent 32 is typically tailored to the needs and capabilities of the specific device 12 on which the experience agent 32 is instantiated. In some embodiments, services implementing experience dimensions are implemented in a distributed manner across the devices 12 and the data center 40. In other embodiments, the devices 12 have a very thin experience agent 32 with little functionality beyond a minimum API and sentio codec, and the bulk of the services and thus composition and direction of the experience are implemented within the data center 40.

Data center 40 includes an experience server 42, a plurality of content servers 44, and a service platform 46. As will be appreciated, data center 40 can be hosted in a distributed manner in the "cloud," and typically the elements of the data center 40 are coupled via a low latency network. The experience server 42, servers 44, and service platform 46 can be implemented on a single computer system, or more likely distributed across a variety of computer systems, and at various locations.

The experience server 42 includes at least one experience agent 32, an experience composition engine 48, and an operating system 50. In one embodiment, the experience composition engine 48 is defined and controlled by the experience provider to compose and direct the experience for one or more participants utilizing devices 12. Direction and composition is accomplished, in part, by merging various content layers and other elements into dimensions generated from a variety of sources such as the service provider 42, the devices 12, the content servers 44, and/or the service platform 46.

The content servers 44 may include a video server 52, an ad server 54, and a generic content server 56. Any content suitable for encoding by an experience agent can be included as an experience layer. These include well know forms such as video, audio, graphics, and text. As described in more detail earlier and below, other forms of content such as gestures, emotions, temperature, proximity, etc., are contemplated for encoding and inclusion in the experience via a sentio codec, and are suitable for creating dimensions and features of the experience.

The service platform 46 includes at least one experience agent 32, a plurality of service engines 60, third party service engines 62, and a monetization engine 64. In some embodiments, each service engine 60 or 62 has a unique, corresponding experience agent. In other embodiments, a single experience 32 can support multiple service engines 60 or 62. The service engines and the monetization engines 64 can be instantiated on one server, or can be distributed across multiple servers. The service engines 60 correspond to engines generated by the service provider and can provide services such as audio remixing, gesture recognition, and other services referred to in the context of dimensions above, etc. Third party service engines 62 are services included in the service platform 46 by other parties. The service platform 46 may have the third-party service engines instantiated directly therein, or within the service platform 46 these may correspond to proxies which in turn make calls to servers under control of the third-parties.

Monetization of the service platform 46 can be accomplished in a variety of manners. For example, the monetization engine 64 may determine how and when to charge the experience provider for use of the services, as well as tracking for payment to third-parties for use of services from the third-party service engines 62.

Figure 27:
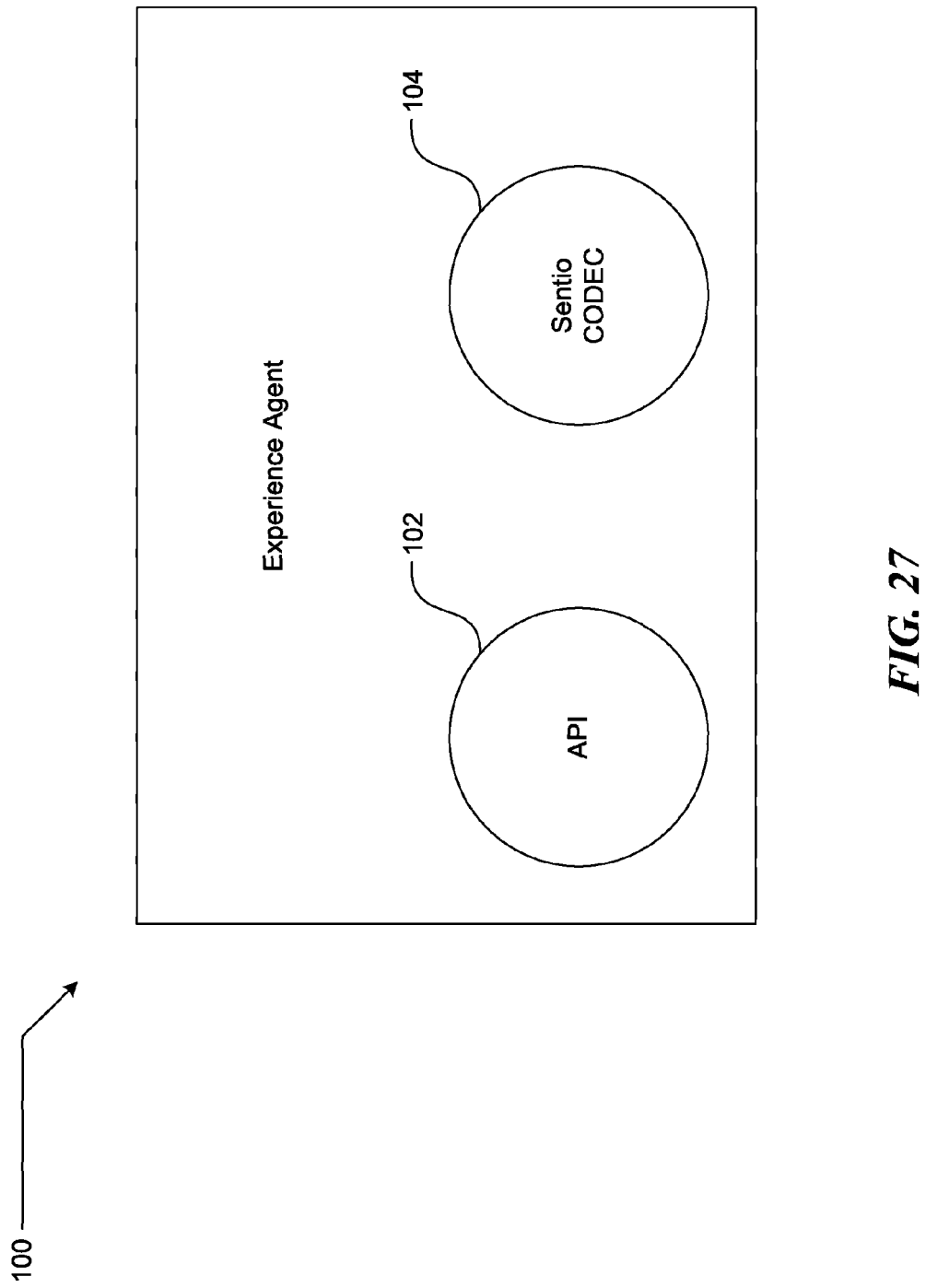
FIG. 27 is a block diagram of an experience agent.

FIG. 27 illustrates a block diagram of an experience agent 100. The experience agent 100 includes an application programming interface (API) 102 and a sentio codec 104. The API 102 is an interface which defines available services, and enables the different agents to communicate with one another and request services.

The sentio codec 104 is a combination of hardware and/or software which enables encoding of many types of data streams for operations such as transmission and storage, and decoding for operations such as playback and editing. These data streams can include standard data such as video and audio. Additionally, the data can include graphics, sensor data, gesture data, and emotion data. ("Sentio" is Latin roughly corresponding to perception or to perceive with one's senses, hence the nomenclature "sensio codec.")

Figure 28:
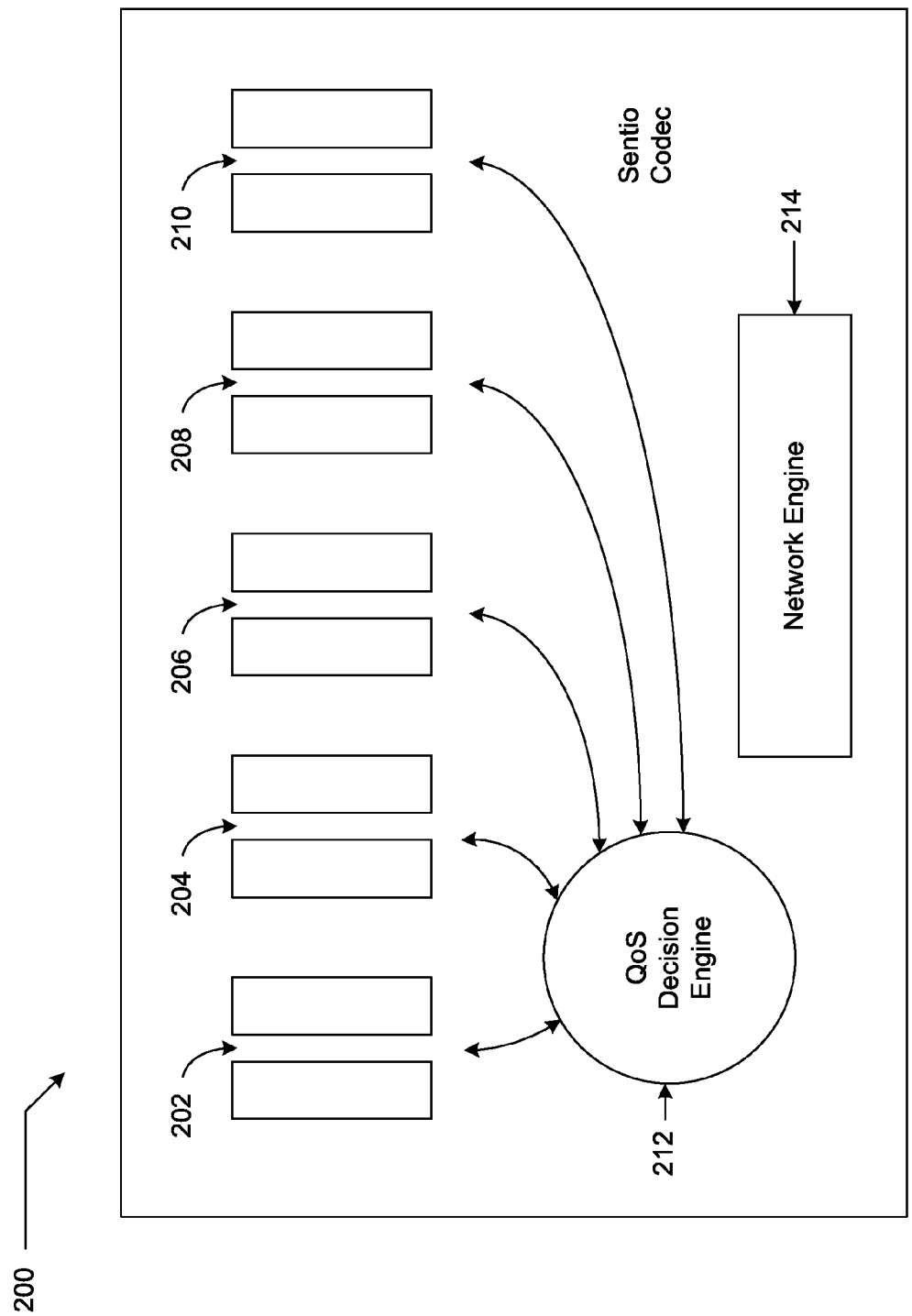
FIG. 28 illustrates a block diagram of a public experience computing environment.
Figure 29:
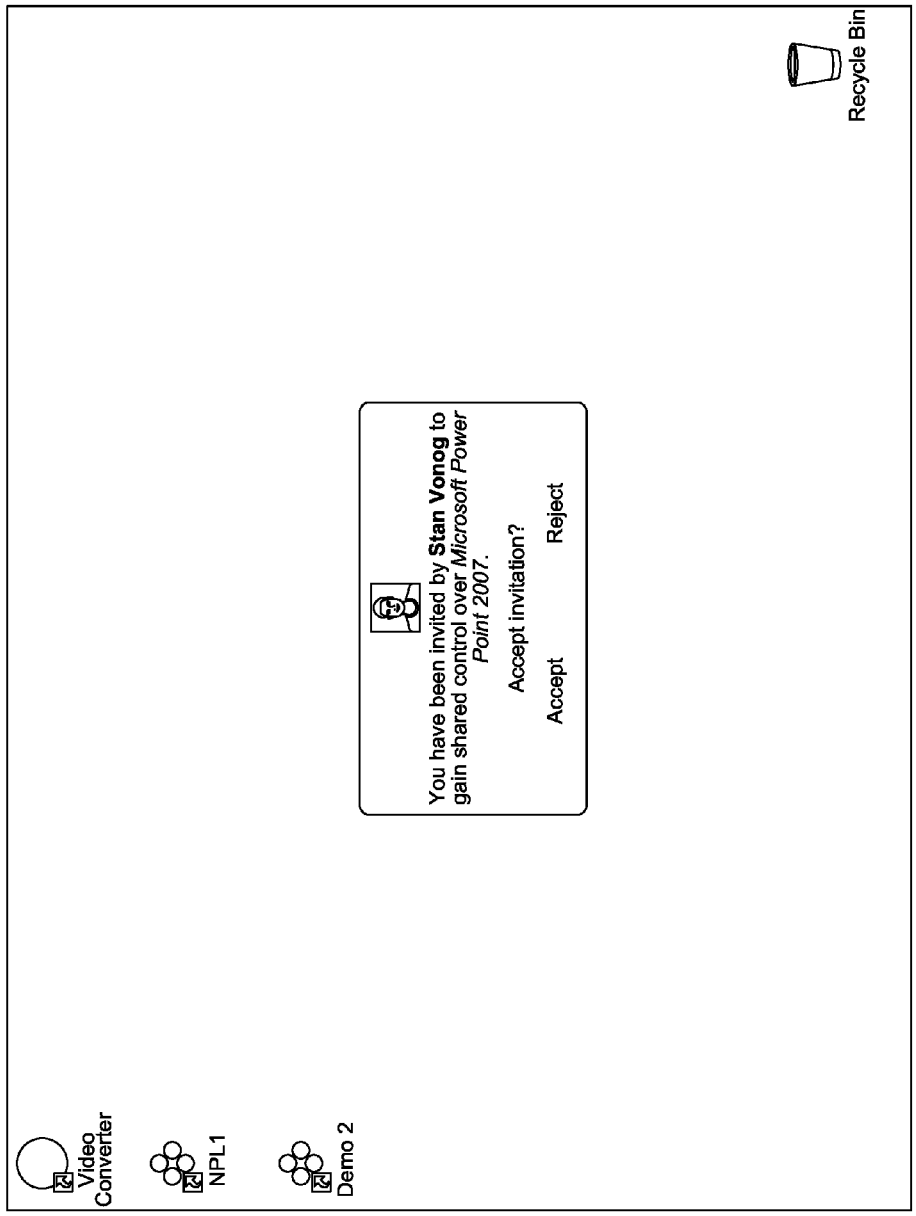
FIG. 29-35 illustrate a demonstration of a video transcoding service utilized by the transcoding application, and incorporating a third-party service.
Figure 30:
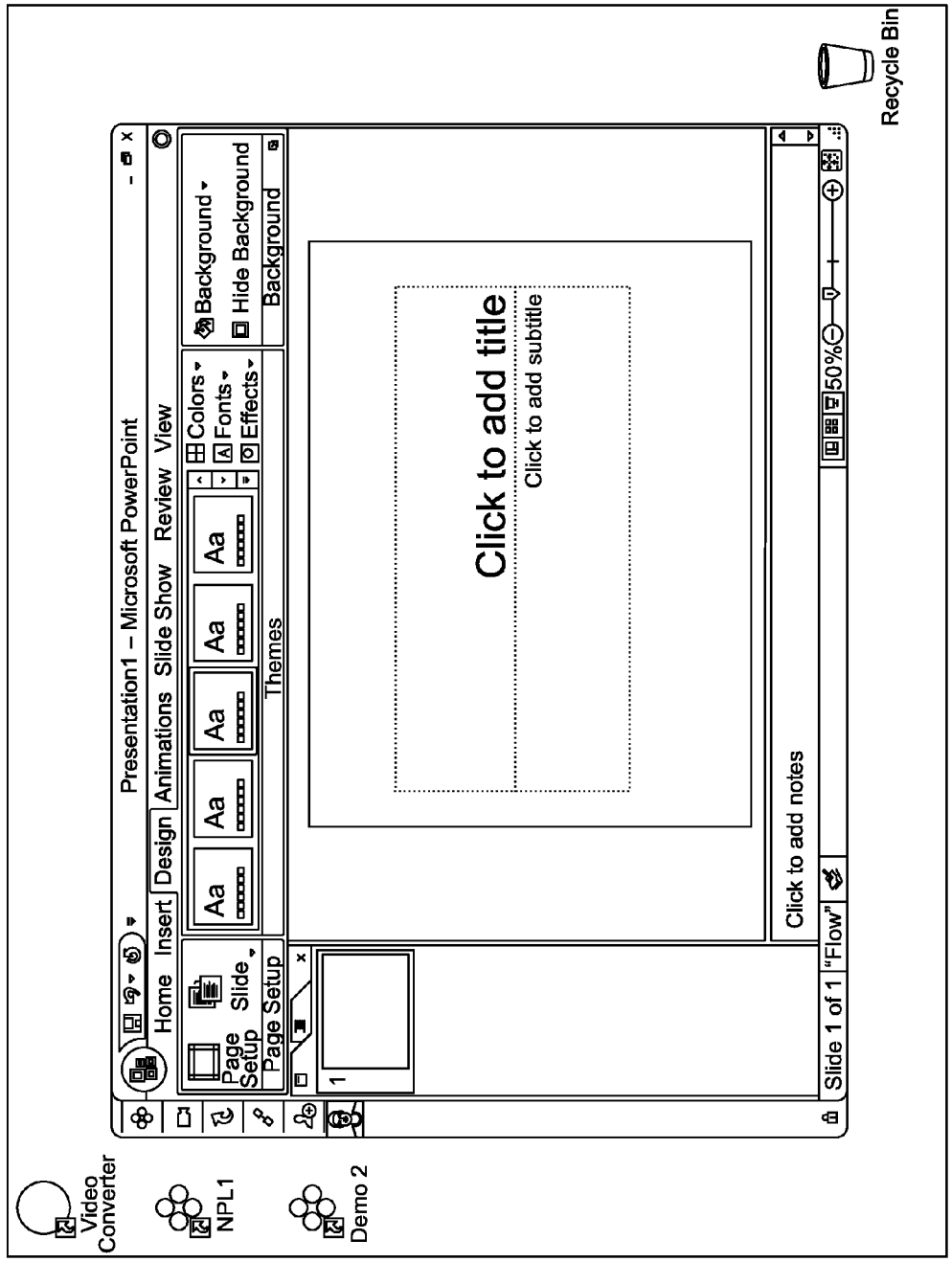

FIG. 28 illustrates a block diagram of a sentio codec 200. The sentio codec 200 includes a plurality of codecs such as video codecs 202, audio codecs 204, graphic language codecs 206, sensor data codecs 208, and emotion codecs 210. The sentio codec 200 further includes a quality of service (QoS) decision engine 212 and a network engine 214. The codecs, the QoS decision engine 212, and the network engine 214 work together to encode one or more data streams and transmit the encoded data according to a low-latency transfer protocol supporting the various encoded data types. One example of this low-latency protocol is described in more detail in Vonog et al.'s U.S. patent application Ser. No. 12/569,876, filed Sep. 29, 2009, and incorporated herein by reference for all purposes including the low-latency protocol and related features such as the network engine and network stack arrangement.

The sentio codec 200 can be designed to take all aspects of the experience platform into consideration when executing the transfer protocol. The parameters and aspects include available network bandwidth, transmission device characteristics and receiving device characteristics. Additionally, the sentio codec 200 can be implemented to be responsive to commands from an experience composition engine or other outside entity to determine how to prioritize data for transmission. In many applications, because of human response, audio is the most important component of an experience data stream. However, a specific application may desire to emphasize video or gesture commands.

The sentio codec provides the capability of encoding data streams corresponding to many different senses or dimensions of an experience. For example, a device 12 may include a video camera capturing video images and audio from a participant. The user image and audio data may be encoded and transmitted directly or, perhaps after some intermediate processing, via the experience composition engine 48, to the service platform 46 where one or a combination of the service engines can analyze the data stream to make a determination about an emotion of the participant. This emotion can then be encoded by the sentio codec and transmitted to the experience composition engine 48, which in turn can incorporate this into a dimension of the experience. Similarly a participant gesture can be captured as a data stream, e.g., by a motion sensor or a camera on device 12, and then transmitted to the service platform 46, where the gesture can be interpreted, and transmitted to the experience composition engine 48 or directly back to one or more devices 12 for incorporation into a dimension of the experience.

Figure 31:
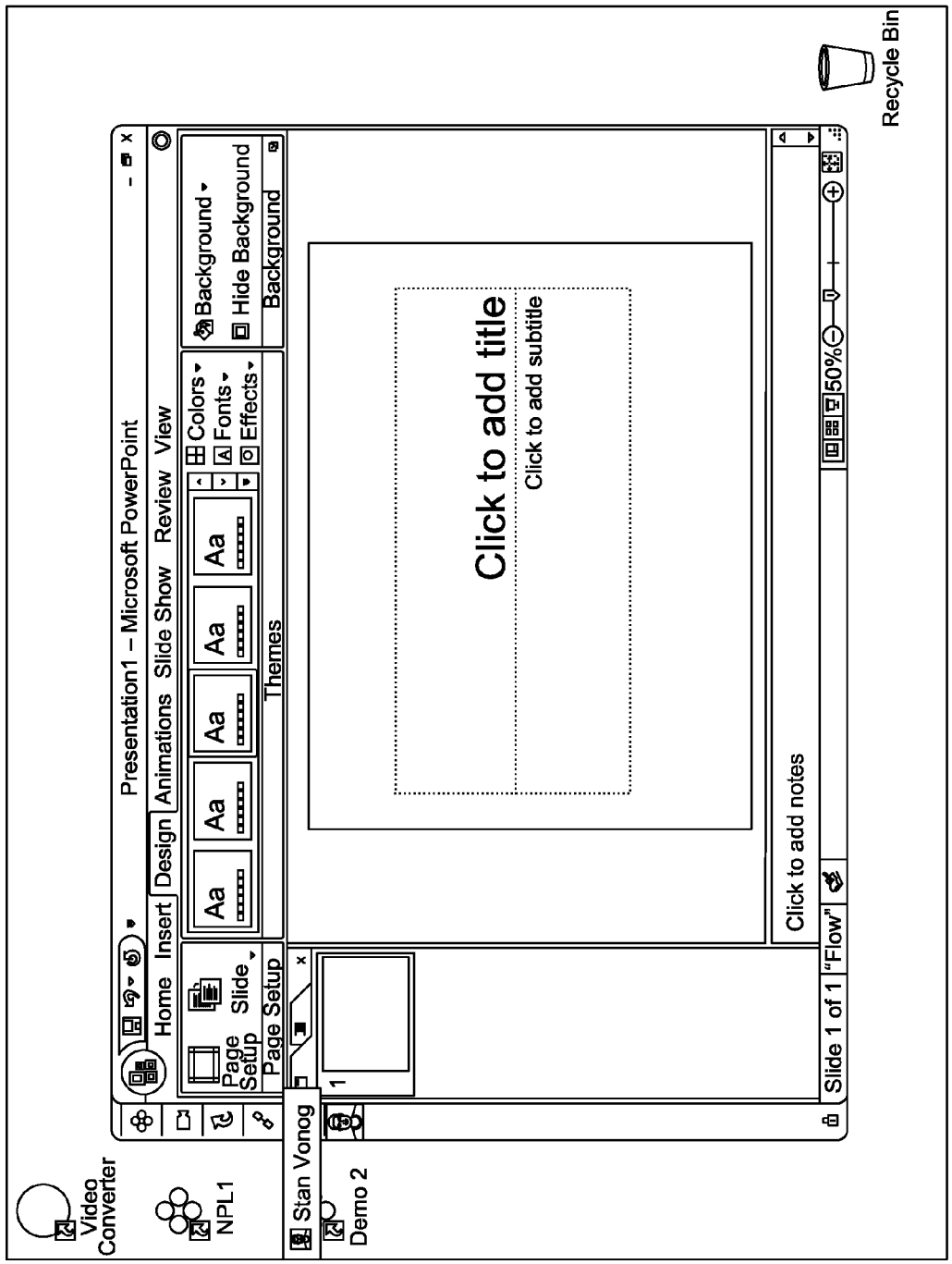
Figure 32:
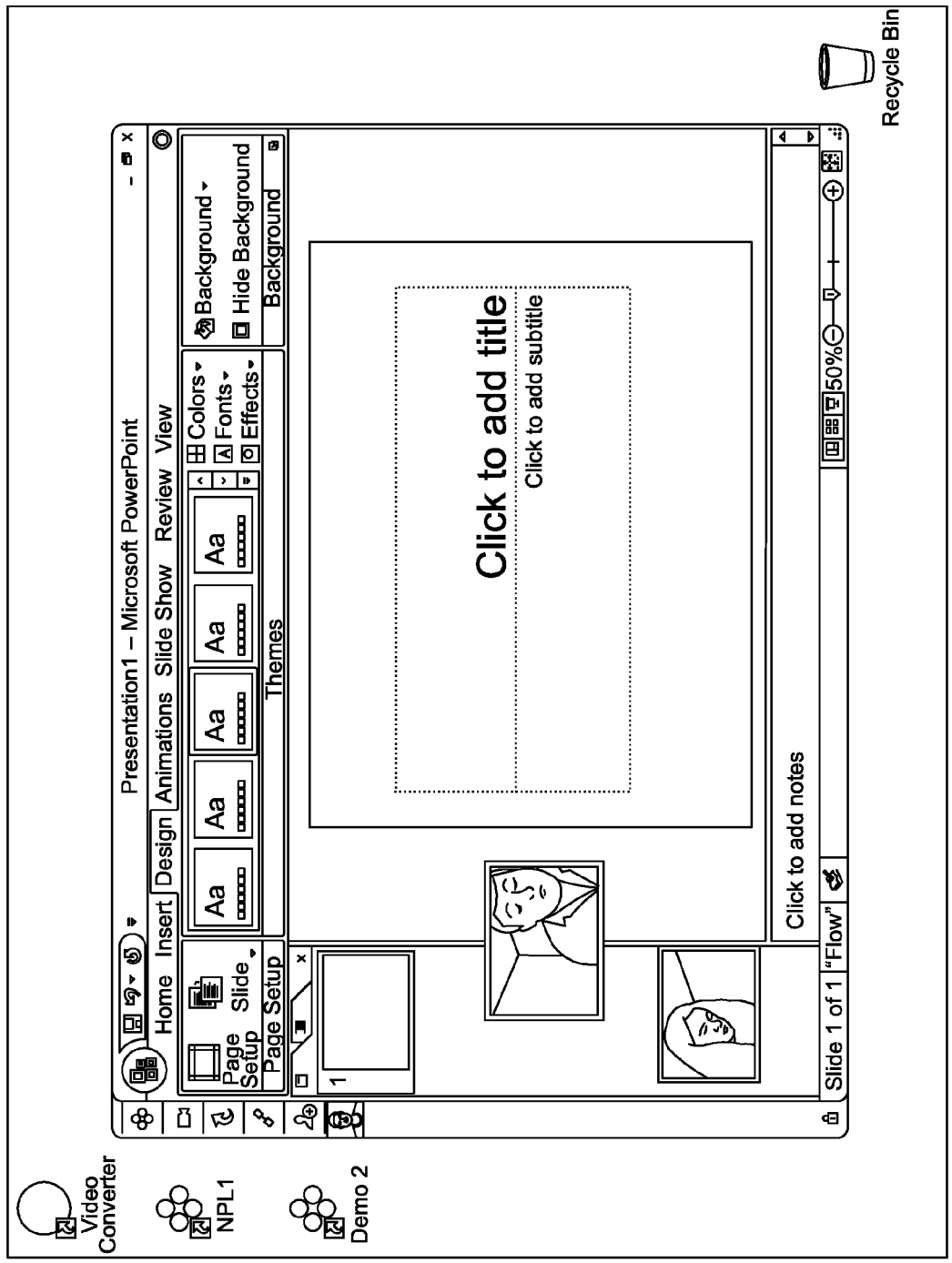
Figure 33:
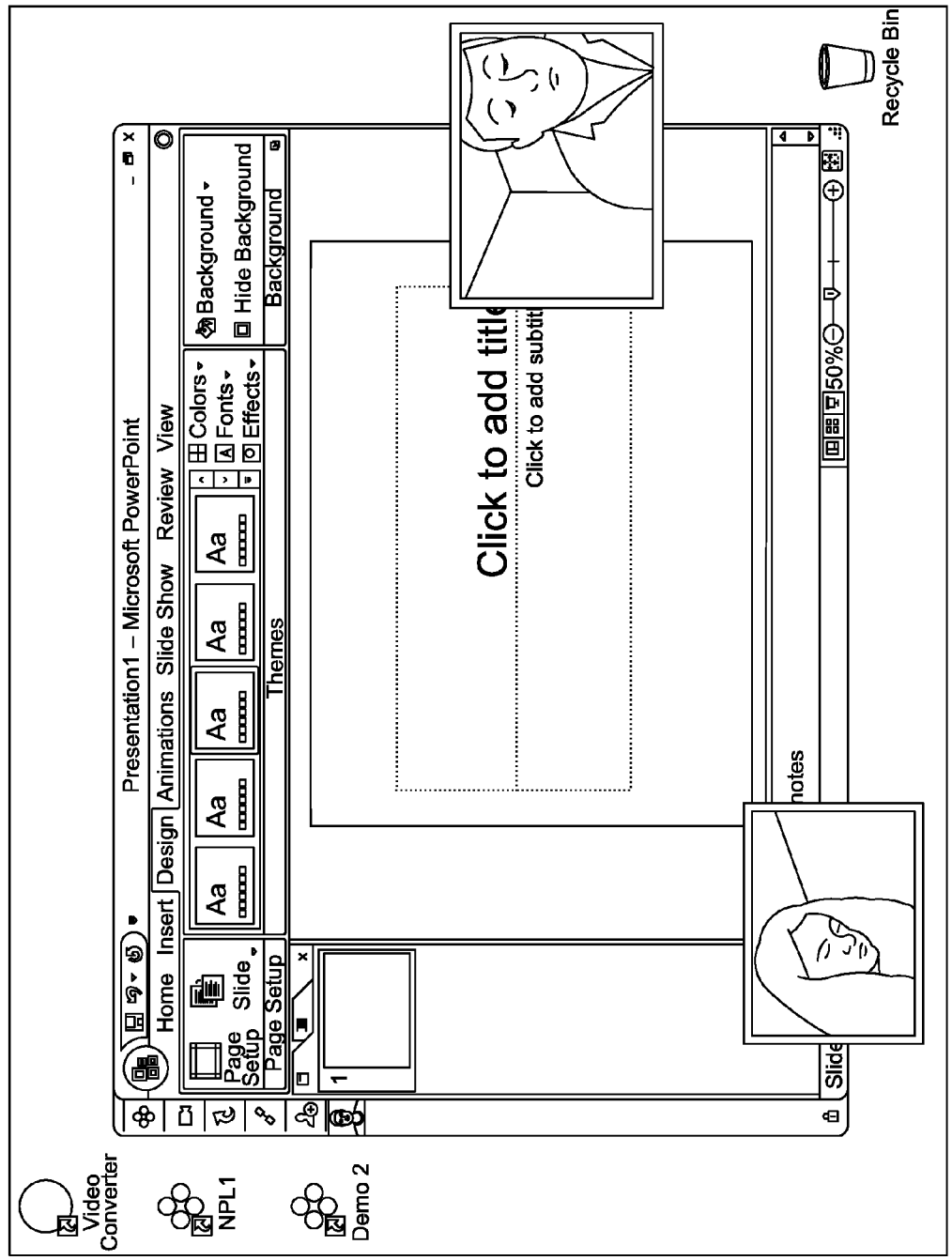
Figure 34:
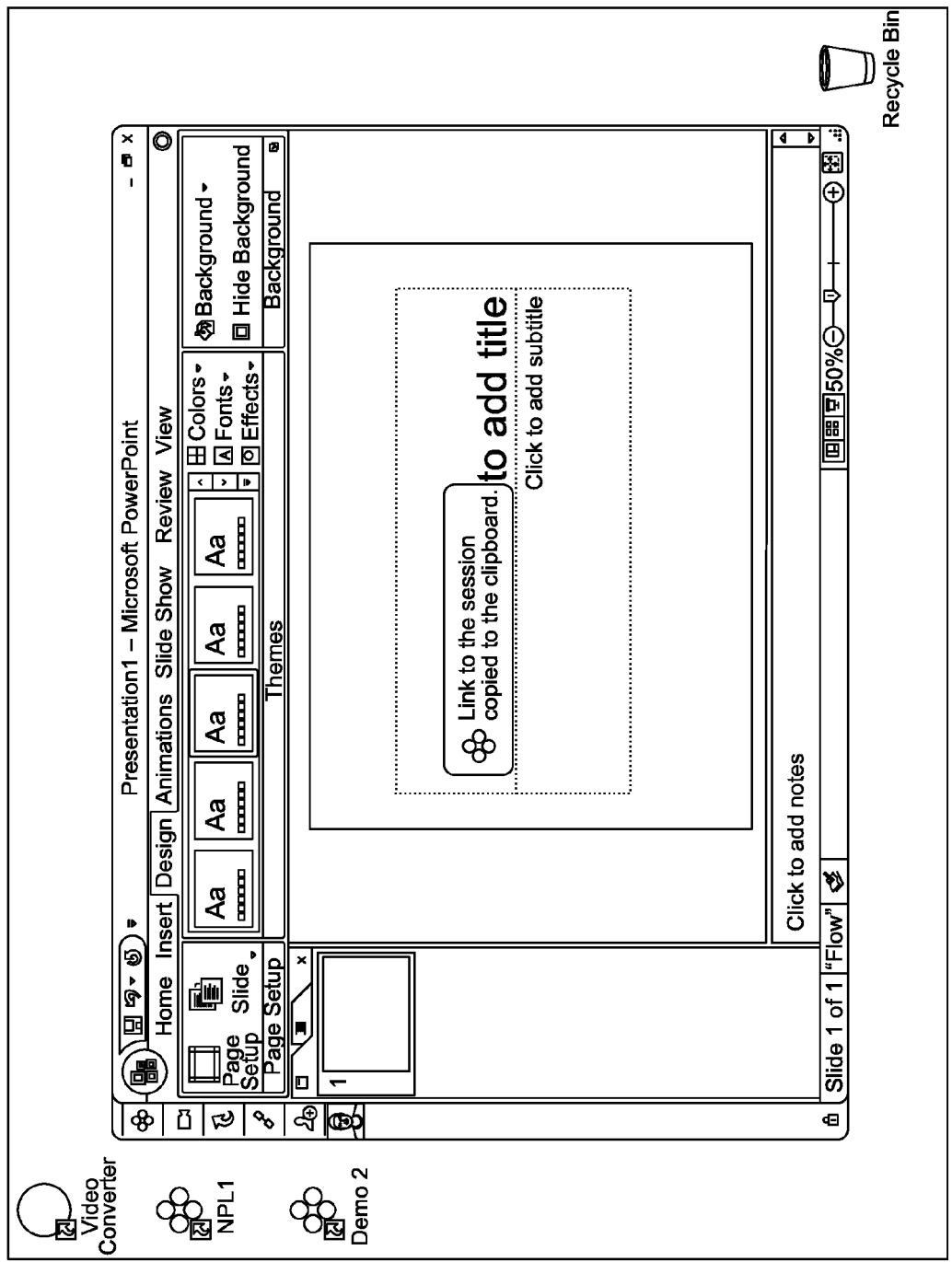
Figure 35:
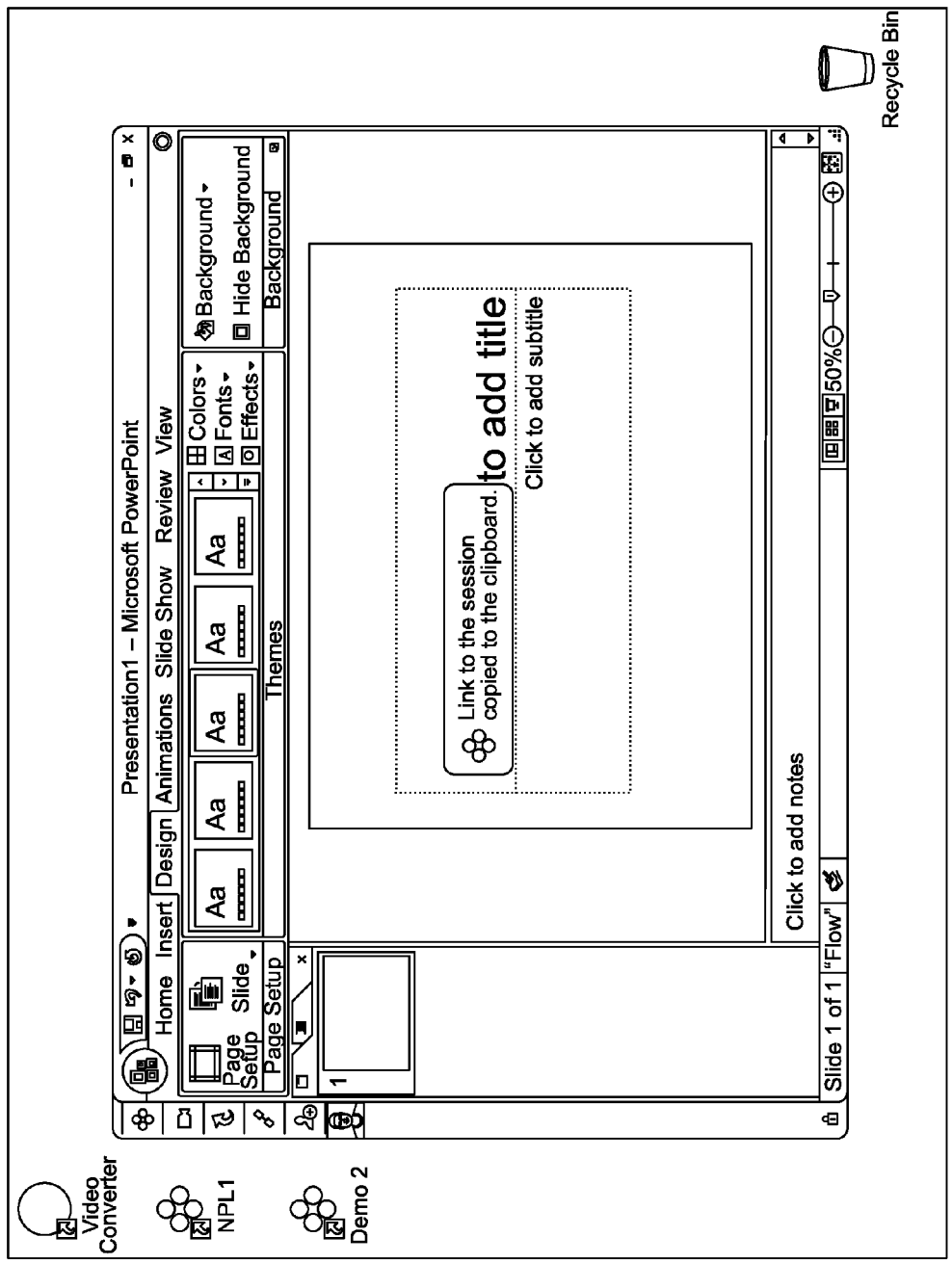

FIGS. 29-35 demonstrate several dimensions available with a base layer generated by piece of code called Microsoft PowerPoint. For example, FIGS. 29-30 and 34-35 illustrate how an interactive frame layer can be merged with the PowerPoint layer. Further, FIGS. 31-33 illustrate how video chat layer(s) can be merged with the PowerPoint layer.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A system for composing and directing multi-dimensional participant experiences, the system facilitated via a low-latency transmission protocol and sentio codecs for encoding and decoding multi-dimensional data streams, the system provided by a service provider for use by an experience provider, the system comprising:

a plurality of devices, wherein each device includes a specific experience agent, and wherein each specific experience agent including a specific (application programming interface) API and a specific sentio codec;

an experience server in communication with the plurality of devices, the experience server including:

a first experience agent, the first experience agent including a first API and a first sentio codec; and an experience composition engine;

a content server in communication with the experience server and configured to provide a first content layer to the experience composition engine;

a service platform in communication with the experience server and configured to provide services to the plurality of devices and the experience server, the service platform including:

a plurality of service engines; and a second experience agent including a second API and a second sentio codec, the service of at least one service engine exposed via the second API; and wherein, the experience composition engine is configured to:

receive layers from the content server and the plurality of devices;

request services from the service platform via the first experience agent; and compose and direct a participant experience using the layers, and services performed by the service platform.

2. The system as recited in claim 1, wherein the plurality of devices are in communication via a wireless network.

3. The system as recited in claim 2, wherein a single participant is using the plurality of devices for a heterogeneous experience.

4. The system as recited in claim 1, wherein a plurality of participants are involved in the participant experience via the plurality of devices.

5. The system as recited in claim 1, wherein the specific experience agent instantiated on each specific device is programmed according to operational capabilities of each specific device.

6. The system as recited in claim 1, wherein the experience server, the service platform, and the content server are in a data center.

7. The system as recited in claim 6, wherein the data center is distributed.

8. The system as recited in claim 1, wherein the first content layer provided by the content server is video content.

9. The system as recited in claim 1 further comprising an ad server in communication with the experience server and operable to provide a second content layer to the experience composition engine, the second layer including at least one advertisement.

10. The system as recited in claim 1, wherein the plurality of service engines include a first set of service engines provided by the service provider.

11. The system as recited in claim 10, wherein the plurality of service engines include a second set of service engines provided by one or more third-parties.

12. The system as recited in claim 10, wherein the service provider charges the experience provider for utilization of the service engines.

13. The system as recited in claim 11, wherein the service provider charges the experience provider for utilization of the second set of services, and the service provider shares revenue with the one or more third-parties.

14. The system as recited in claim 1, wherein the services engines are distributed across a plurality of servers.

15. The system as recited in claim 1, wherein each service engine has a corresponding experience agent including a corresponding API and a corresponding sentio codec.

* * * * *